United States Patent
Kim et al.

(10) Patent No.: US 11,838,091 B2
(45) Date of Patent: Dec. 5, 2023

(54) METHOD AND APPARATUS FOR BEAM FAILURE RECOVERY IN WIRELESS COMMUNICATION SYSTEM

(71) Applicant: Samsung Electronics Co., Ltd., Suwon-si (KR)

(72) Inventors: Youngbum Kim, Suwon-si (KR); Younsun Kim, Suwon-si (KR); Hyunseok Ryu, Suwon-si (KR); Taehan Bae, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/832,130

(22) Filed: Jun. 3, 2022

(65) Prior Publication Data

US 2022/0399928 A1 Dec. 15, 2022

(30) Foreign Application Priority Data

Jun. 10, 2021 (KR) .......................... 10-2021-0075445

(51) Int. Cl.
*H04B 7/06* (2006.01)
*H04W 74/08* (2009.01)
(Continued)

(52) U.S. Cl.
CPC ........ *H04B 7/0695* (2013.01); *H04W 72/044* (2013.01); *H04W 72/1273* (2013.01);
(Continued)

(58) Field of Classification Search
CPC .. H04B 7/0695; H04B 7/0602; H04B 7/0682; H04W 72/044; H04W 72/1273;
(Continued)

(56) References Cited

U.S. PATENT DOCUMENTS

2019/0028174 A1 1/2019 Chakraborty et al.
2020/0029383 A1* 1/2020 Venugopal ............. H04B 7/088
(Continued)

FOREIGN PATENT DOCUMENTS

| WO | 2020/051892 A1 | 3/2020 |
| WO | 2020/085808 A1 | 4/2020 |
| WO | 2020/143568 A1 | 7/2020 |

OTHER PUBLICATIONS

International Search Report and Written Opinion dated Sep. 19, 2022, issued in International Patent Application No. PCT/KR2022/007904.

*Primary Examiner* — Harry H Kim
(74) *Attorney, Agent, or Firm* — Jefferson IP Law, LLP

(57) ABSTRACT

A fifth generation (5G) or sixth generation (6G) communication system for supporting a higher data transmission rate is provided. A method performed by a terminal configured with a carrier aggregation (CA) for a first cell and a second cell is provided. The method includes determining a beam failure of the first cell, in response to the determining of the beam failure of the first cell, transmitting a first message of a random access for a beam failure recovery, receiving a second message of the random access on a physical downlink shared channel (PDSCH) of the first cell based on the transmission of the first message, transmitting a third message of the random access based on the second message and receiving a fourth message of the random access on the PDSCH of the first cell based on the transmission of the third message, wherein control information is received on a PDCCH.

20 Claims, 29 Drawing Sheets

(51) Int. Cl.
*H04W 76/19* (2018.01)
*H04L 5/00* (2006.01)
*H04W 76/15* (2018.01)
*H04W 74/00* (2009.01)
*H04W 16/28* (2009.01)
*H04W 72/044* (2023.01)
*H04W 72/1273* (2023.01)

(52) U.S. Cl.
CPC ... *H04W 74/0841* (2013.01); *H04W 74/0866* (2013.01); *H04W 76/19* (2018.02)

(58) Field of Classification Search
CPC ......... H04W 74/0841; H04W 74/0866; H04W 76/19; H04W 76/15; H04W 74/0833; H04W 74/002; H04W 16/28; H04L 5/001
See application file for complete search history.

(56) References Cited

U.S. PATENT DOCUMENTS

| | | | |
|---|---|---|---|
| 2020/0145280 A1 | 5/2020 | Cirik et al. | |
| 2020/0229197 A1* | 7/2020 | Geng | H04W 74/006 |
| 2020/0322031 A1* | 10/2020 | You | H04L 5/001 |
| 2021/0092002 A1 | 3/2021 | Bai et al. | |
| 2022/0109547 A1* | 4/2022 | Svedman | H04L 5/0091 |
| 2022/0337998 A1* | 10/2022 | Tian | H04W 80/02 |

\* cited by examiner

METHOD AND APPARATUS FOR BEAM FAILURE RECOVERY IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0075445, filed on Jun. 10, 2021, in the Korean Intellectual Property Office, the disclosure of which is incorporated by reference herein in its entirety.

BACKGROUND

1. Field

The disclosure relates to a method and an apparatus for transmitting/receiving signals in a wireless communication system. More particularly, the disclosure relates to a method for beam failure recovery in a wireless communication system and an apparatus configured to perform the same.

2. Description of Related Art

Fifth generation (5G) mobile communication technologies define broad frequency bands such that high transmission rates and new services are possible, and may be implemented not only in "Sub 6 gigahertz (GHz)" bands such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz bands (for example, 95 GHz to 3 terahertz (THz) bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for detecting and recovering a beam failure resulting from a channel state change signals in a wireless communication system.

Additional aspects will be set forth in part in the description, which follows and, in part, will be apparent from the description, or may be learned by practice of the presented embodiments.

In accordance with an aspect of the disclosure, a method performed by a terminal configured with a carrier aggregation (CA) for a first cell and a second cell is provided. The method includes determining a beam failure of the first cell, in response to the determining of the beam failure of the first cell, transmitting a first message of a random access for a beam failure recovery, receiving a second message of the random access on a physical downlink shared channel (PDSCH) of the first cell based on the transmission of the first message, transmitting a third message of the random access based on the second message and receiving a fourth message of the random access on the PDSCH of the first cell based on the transmission of the third message, wherein control information for scheduling the second message and the fourth message is received on a physical downlink control channel (PDCCH) of the second cell.

In accordance with another aspect of the disclosure, a method performed by a base station serving a terminal configured with a carrier aggregation (CA) for a first cell and a second cell is provided. The method includes receiving a first message of a random access for a beam failure recovery from the terminal in which a beam failure for the first cell has occurred, transmitting, to the terminal, a second message of the random access on a physical downlink shared channel (PDSCH) of the first cell based on the first message, receiving, from the terminal, a third message of the random access based on the second message and transmitting, to the terminal, a fourth message of the random access on the PDSCH of the first cell based on the receiving of the third message, wherein control information for scheduling the second message and the fourth message is transmitted on a physical downlink control channel (PDCCH) of the second cell.

In accordance with another aspect of the disclosure, a terminal configured with a carrier aggregation (CA) for a first cell and a second cell is provided. The terminal includes a transceiver and a controller configured to determine a beam failure of the first cell, in response to the determination of the beam failure of the first cell, to transmit a first message of a random access for a beam failure recovery, to receive a second message of the random access on a physical downlink shared channel (PDSCH) of the first cell based on the transmission of the first message, to transmit a third message of the random access based on the second message, and to receive a fourth message of the random access on the PDSCH of the first cell based on the transmission of the third message, wherein control information for scheduling the second message and the fourth message is received on a physical downlink control channel (PDCCH) of the second cell.

In accordance with another aspect of the disclosure, a base station serving a terminal configured with a carrier aggregation (CA) for a first cell and a second cell is provided. The base station includes a transceiver and a controller configured to receive a first message of a random access for a beam failure recovery from the terminal in which a beam failure for the first cell has occurred, to transmit, to the terminal, a second message of the random access on a physical down-link shared channel (PDSCH) of the first cell based on the first message, to receive, from the terminal, a third message of the random access based on the second message, and to transmit, to the terminal, a fourth message of the random access on the PDSCH of the first cell based on the transmission of the third message, wherein control information for scheduling the second message and the fourth message is transmitted on a physical downlink control channel (PDCCH) of the second cell.

According to various embodiments of the disclosure, an improved communication method may be provided.

In addition, according to various embodiments of the disclosure, a method for detecting and recovering a beam failure in a wireless communication system configured to support carrier arrogation (CA) may be defined, thereby providing a stable communication service.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
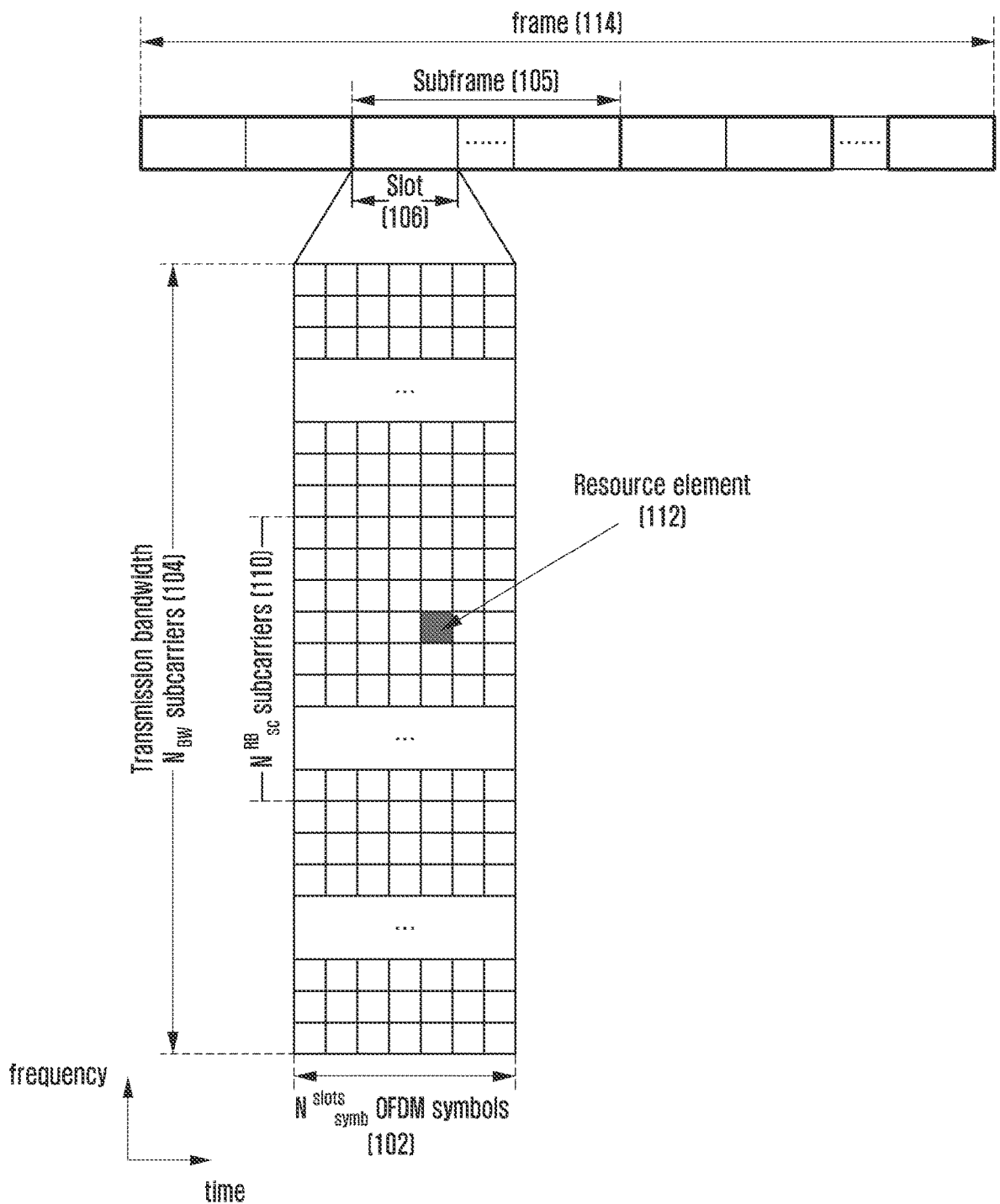
FIG. 1 illustrates a basic structure of a time-frequency resource domain of a 5G system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs)

within a device or a security multimedia card. Further, the "unit" in the embodiments may include one or more processors.

In the following description of the disclosure, a detailed description of known functions or configurations incorporated herein will be omitted when it is determined that the description may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the terms "physical channel" and "signal" may be interchangeably used with the term "data" or "control signal". For example, the term "physical downlink shared channel (PDSCH) refers to a physical channel over which data is transmitted, but may also be used to refer to the data. That is, in the disclosure, the expression "transmitting a physical channel" may be construed as having the same meaning as the expression "transmitting data or a signal over a physical channel".

Hereinafter, in the disclosure, higher layer signaling refers to a signal transmission method in which a signal is transmitted from a base station to a UE by using a downlink data channel of a physical layer or in which a signal is transmitted from a UE to a base station by using an uplink data channel of a physical layer. The higher layer signaling may be understood as radio resource control (RRC) signaling or a medium access control (MAC) control element (MAC CE).

In the following description of the disclosure, terms and names defined in the 3rd generation partnership project new radio (3GPP NR: standards for 5th generation mobile communication) standards are used for the convenience of description. However, the disclosure is not limited by these terms and names, and may be applied in the same way to systems that conform other standards. In addition, the term "terminal" may refer to not only cellular phones, smartphones, IoT devices, and sensors, but also other wireless communication devices.

In the following description, a base station is an entity that allocates resources to terminals, and may be at least one of a gNode B, a gNB, an eNode B, an eNB, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, the base station and the terminal are not limited to these examples.

Recently, in order to handle explosively increasing mobile data traffic, the initial standard of 5th generation (5G) or new radio access technology (NR) systems, which are next-generation communication systems after LTE or evolved universal terrestrial radio access (E-UTRA) systems and LTE advanced (LTE-A) or E-UTRA evolution systems, has been completed. As compared with legacy mobile communication systems focused on typical voice/data communication, the 5G systems are aimed at providing and meeting requirements for various services such as enhanced mobile broadband (eMBB) services for improving the existing voice/data communication, ultra-reliable and low latency communication (URLLC) services, and massive machine-type communication (MTC) services for supporting massive machine type communication.

A system transmission bandwidth for a single carrier in the legacy LTE and LTE-A systems is limited to up to 20 MHz, whereas the 5G systems are mainly aimed at providing ultra-high-speed data services of up to several Gbps by using an ultra-wideband remarkably greater than the system transmission bandwidth of the legacy LTE and LTE-A systems. As such, an ultra-high frequency band from several GHz to 100 GHz is considered as a candidate frequency band for the 5G systems to easily ensure an ultra-wideband frequency. Additionally, ensuring a wideband frequency for the 5G systems through frequency reallocation or allocation based on a frequency band included in a range from several hundred MHz to several GHz used by legacy mobile communication systems is also being considered.

An ultra-high frequency band has a wavelength of several millimeters (mm) and may also be called an mmWave band. However, in the ultra-high frequency band, path loss increases in proportion to the frequency band and thus coverage of a mobile communication system decreases.

In order to cope with the decrease in the coverage in the ultra-high frequency band, a beamforming technology for increasing a radio transmission distance by concentrating radiation energy of radio waves on a predetermined target point by using a plurality of antennas is applied. That is, a beam width of a signal using the beamforming technology is relatively narrowed and radiation energy is concentrated within the narrowed beam width, thereby increasing a radio transmission distance. The beamforming technology is applicable not only to a transmitter but also to a receiver. In addition to the coverage increasing effect, the beamforming technology also has an effect of reducing interference in regions other than a beamforming direction. For proper implementation of the beamforming technology, an accurate transmission/reception beam measurement and feedback method are required. The beamforming technology is applicable to control or data channel having one-to-one correspondence between a predetermined UE and a based station. The beamforming technology is also applicable to control and data channels for transmitting common signals, e.g., a synchronization signal, a physical broadcast channel (PBCH) signal, and system information, from the base station to a plurality of UEs in a system, to increase coverage. When the beamforming technology is applied to the common signal, a beam sweeping technology for transmitting a signal by changing a beam direction may be additionally applied to allow the common signals to reach a UE positioned at a random location within a cell.

As another requirement for the 5G systems, ultra-low latency services having a transmission delay of about 1 ms between the transmitter and the receiver are required. In order to reduce the transmission delay, for example, a frame structure based on a short transmission time interval (TTI) as compared to that of the LTE and LTE-A systems needs to be designed. The TTI is a basic time unit for scheduling and the legacy LTE and LTE-A systems have a TTI of 1 ms corresponding to the length of one subframe. For example, the short TTI capable of meeting the requirement for ultra-low latency services in the 5G systems may include 0.5 ms, 0.25 ms, and 0.125 ms which are shorter than that of the legacy LTE and LTE-A systems.

The disclosure relates to a method and apparatus for transmission and reception by a UE in a wireless communication system to which CA is applied.

The disclosure relates to a cellular wireless communication system, and to a method for transmission and reception of a control channel and a data channel by a UE performing a carrier aggregation operation.

The disclosure relates to a method for detecting and recovering a beam failure due to a change in a channel state in a wireless communication system.

The disclosure provides a stable communication service by defining a method for detecting and recovering a beam failure in a wireless communication system supporting CA.

FIG. 1 illustrates a basic structure of a time-frequency resource domain of a 5G system according to an embodiment of the disclosure. That is, FIG. 1 illustrates a basic structure of a time-frequency resource domain corresponding to a radio resource domain for data or control channel transmission of a 5G system.

Referring to FIG. 1, a horizontal axis indicates a time domain and a vertical axis indicates a frequency domain. The minimum transmission unit in the time domain of the 5G system is an orthogonal frequency division multiplexing (OFDM) symbol, $N_{symb}^{slot}$ symbols 102 configure one slot 106, and $N_{slot}^{subframe}$ slots configure one subframe 105. The subframe has a length of 1.0 ms, and 10 ms frame 114 may be configured by including 10 subframes. The minimum transmission unit in the frequency domain is a subcarrier, and a total system transmission bandwidth may include a total of $N_{BW}$ subcarriers 104.

A basic resource unit in the time-frequency region is a resource element (RE) 112 which may be indicated by an OFDM symbol index and a subcarrier index. A resource block (RB) may be defined as $N_{sc}^{RB}$ consecutive subcarriers 110 in the frequency domain. In the 5G system, $N_{sc}^{RB}=12$, and a data rate may increase in proportion to the number of RBs scheduled for the UE.

In the 5G system, a base station may map data in units of an RB, and may perform scheduling an RB configuring one slot with regard to a predetermined UE generally. That is, in the 5G system, a basic time unit for scheduling may be a slot, and a basic frequency unit for scheduling may be an RB.

The number of OFDM symbols $N_{symb}^{slot}$ is determined based on the length of a cyclic prefix (CP) added per symbol to prevent inter-symbol interference. For example, $N_{symb}^{slot}=14$ when a normal CP is applied, and $N_{symb}^{slot}=12$ when an extended CP is applied. Compared to the normal CP, the extended CP is applied to a system having a large radio transmission distance and thus orthogonality between symbols may be maintained. In a case of the normal CP, since a ratio of the CP length to the symbol length is maintained at a constant value, the overhead due to the CP may be maintained constant regardless of the subcarrier spacing. That is, when the subcarrier spacing is small, the symbol length may be increased, and accordingly, the CP length may also be increased. On the contrary, when the subcarrier spacing is large, the symbol length may be shortened, and accordingly, the CP length may be reduced. The symbol length and the CP length may be inversely proportional to the subcarrier spacing.

In the 5G system, various frame structures may be supported by adjusting a subcarrier spacing in order to satisfy various services and requirements. For example, In view of an operating frequency band, a larger subcarrier spacing is more advantageous for phase noise recovery in a high frequency band.

In view of a transmission time, if a subcarrier spacing is large, the symbol length in the time domain is shortened, and as a result, the slot length is shortened, which is advantageous to support an ultra-low latency service such as URLLC.

In view of a cell size, since a longer CP length may support a larger cell, a smaller subcarrier spacing may support a relatively larger cell. A cell is a concept indicating an area covered by one base station in mobile communication.

The subcarrier spacing, CP length, and the like are essential information for OFDM transmission and reception, and only when a base station and a UE identify the information as mutually-common values, transmission and reception may be smoothly performed. Table 1 shows the relationship between subcarrier spacing configuration ($\mu$), subcarrier spacing ($\Delta f$), and CP length supported by the 5G system.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 2 indicates, in case of normal CP, for each subcarrier spacing configuration ($\mu$), the number of symbols per slot ($N_{symb}^{slot}$), the number of slots per frame ($N_{slot}^{frame,\mu}$), and the number of slots per subframe ($N_{slot}^{subframe,\mu}$).

TABLE 2

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 indicates, in a case of extended CP, for each subcarrier spacing configuration ($\mu$), the number of symbols per slot ($N_{symb}^{slot}$), the number of slots per frame ($N_{slot}^{subframe,\mu}$), and the number of slots per subframe ($N_{slot}^{subframe,\mu}$).

TABLE 3

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

Figure 2:
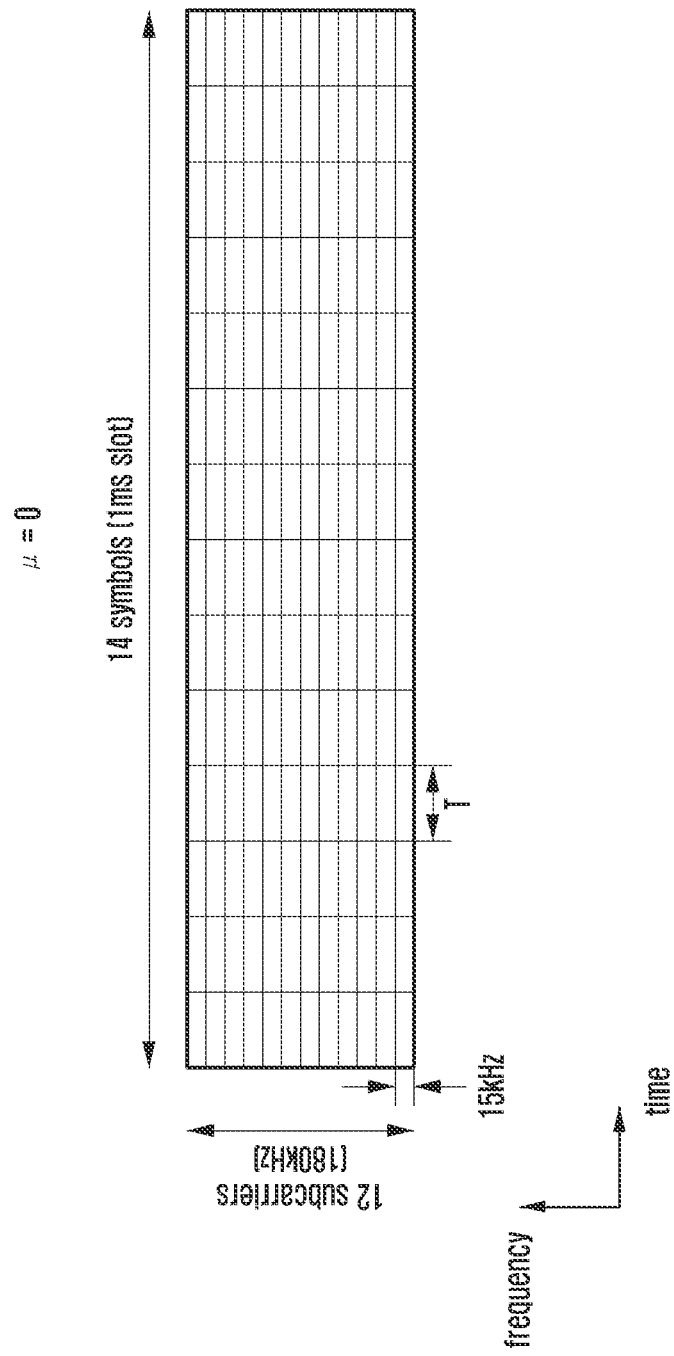
FIG. 2 illustrates an example of a frame structure of a 5G system according to an embodiment of the disclosure.
Figure 3:
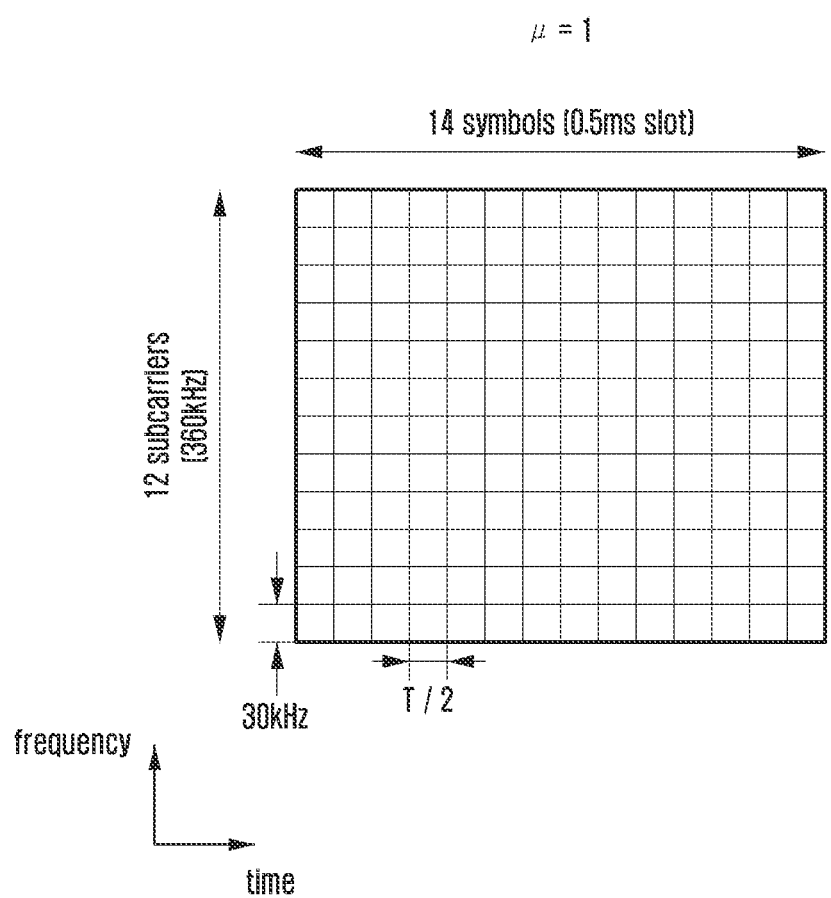
FIG. 3 illustrates another example of a frame structure of a 5G system according to an embodiment of the disclosure.
Figure 4:
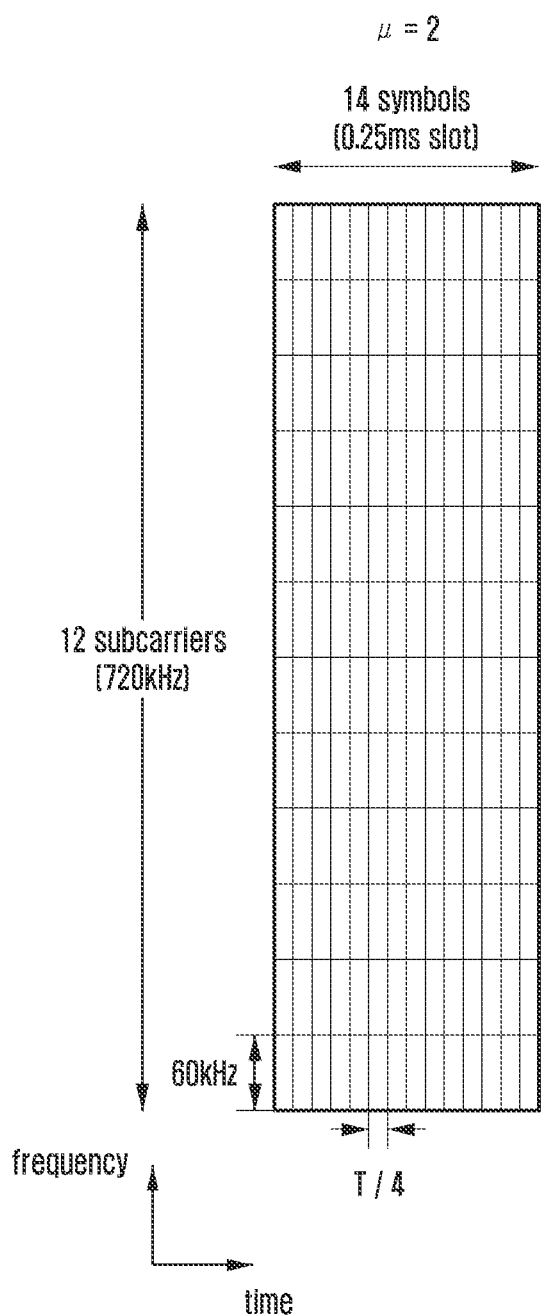
FIG. 4 illustrates another example of a frame structure of a 5G system according to an embodiment of the disclosure.

FIGS. 2, 3, and 4 show examples of a frame structure when subcarrier spacing configuration $\mu=0$, 1, and 2, respectively, in a case of normal CP. Examples of FIGS. 2, 3, and 4 may each correspond to an essential parameter set defining a frame structure, and may include subcarrier spacing, a CP length, a slot length, and the like.

In the early stage of the 5G system, at least coexistence or dual mode operation with a legacy LTE/LTE-A system is expected. As such, the legacy LTE/LTE-A system provides a stable system operation, and the 5G system may provide an enhanced service to the UE. Therefore, a frame structure of the 5G system is required to at least include a frame structure or an essential parameter set (subcarrier spacing=15 kHz) of the LTE/LTE-A system.

FIG. 2 illustrates an example of a frame structure of a 5G system according to an embodiment of the disclosure. That is, FIG. 2 illustrates a 5G frame structure such as a frame structure of LTE/LTE-A or an essential parameter set.

Referring to FIG. 2, a frame structure shown in FIG. 2 corresponds to a structure where subcarrier spacing configuration is µ=0, and illustrates an example in which subcarrier spacing is 15 kHz, 14 symbols configure 1 ms slot, and a resource block (RB) is configured by 12 subcarriers (=180 kHz=12×15 kHz). One slot may configure one subframe, and 10 subframes may configure one frame.

FIG. 3 illustrates another example of a frame structure of a 5G system according to an embodiment of the disclosure.

Referring to FIG. 3, frame structure shown in FIG. 3 corresponds to a structure where subcarrier spacing configuration is µ=1, and illustrates an example in which subcarrier space is 30 kHz, 14 symbols configure 0.5 ms slot, and an RB is configured by 12 subcarriers (=360 kHz=12×30 kHz). That is, compared to the frame structure of FIG. 2, the frame structure of FIG. 3 indicates that subcarrier spacing and a size of a PRB are increased twice, and a slot length and a symbol length are decreased twice. Two slots may configure one subframe, and 20 subframes may configure one frame.

FIG. 4 illustrates still another example of a frame structure of a 5G system according to an embodiment of the disclosure.

Referring to FIG. 4, frame structure shown in FIG. 4 corresponds to a structure where subcarrier spacing configuration is µ=2, and illustrates an example in which subcarrier spacing is 60 kHz, 14 symbols configure 0.25 ms slot, and an RB is configured by 12 subcarriers (=720 kHz=12×60 kHz). That is, compared to the frame structure of FIG. 2, the frame structure of FIG. 4 indicates that subcarrier spacing and a size of an RB (or physical resource block (PRB)) are increased four times, and a slot length and a symbol length are decreased four times. Four slots may configure one subframe, and 40 subframes may configure one frame.

That is, when the frame structure described in FIGS. 2 to 4 is normalized, a subcarrier spacing, a CP length, a slot length, and the like, which are an essential parameter set, may have the integer-multiple relation therebetween according to each frame structure, so as to provide high scalability. Further, in order to indicate a reference time unit unrelated to the frame structure type, a subframe having a fixed length of 1 ms may be defined.

The frame structure illustrated in FIGS. 2 to 4 may be applied to correspond to various scenarios. In view of a cell size, when a CP length is increased, a larger cell may be supported, and thus the frame structure of FIG. 2 may support a relatively large call, compared to the frame structures of FIGS. 3 and 4. In view of an operating frequency band, when subcarrier spacing is increased, recovery from phase noise of a high frequency band becomes easy, and thus the frame structure of FIG. 4 may support a relatively high operating frequency, compared to the frame structures of FIGS. 2 and 3. In view of a service, since a shorter length of a slot serving as a basic time unit for scheduling is more advantageous to support an ultra-low latency service such as URLLC, the frame structure of FIG. 4 may be more appropriate for the URLLC service as compared to the frame structures of FIGS. 2 and 3.

Hereinafter, in the description of the disclosure, an uplink (UL) may refer to a radio link for transmitting data or a control signal from a UE to a base station, and a downlink (DL) may refer to a radio link for transmitting data or a control signal from the base station to the UE.

In an initial access operation when the UE accesses the system for the first time, the UE may establish DL time/frequency synchronization from a synchronization signal transmitted by the base station through cell search, and may obtain cell identity (ID). In addition, the UE may receive a physical broadcast channel (PBCH) by using the obtained cell ID, and may obtain a master information block (MIB), which is essential system information, from the PBCH. Additionally, the UE may receive system information (SIB) transmitted by the base station to obtain cell common transmission/reception related control information. The cell common transmission/reception related control information may include random access related control information, paging related control information, common control information for various physical channels, and the like.

A synchronization signal is a reference signal for the cell search, and a subcarrier spacing appropriate for a channel environment such as phase noise and the like may be applied per frequency band. A different subcarrier spacing may be applied to the data or control channel based on a service type to support various services as described above.

Figure 5:
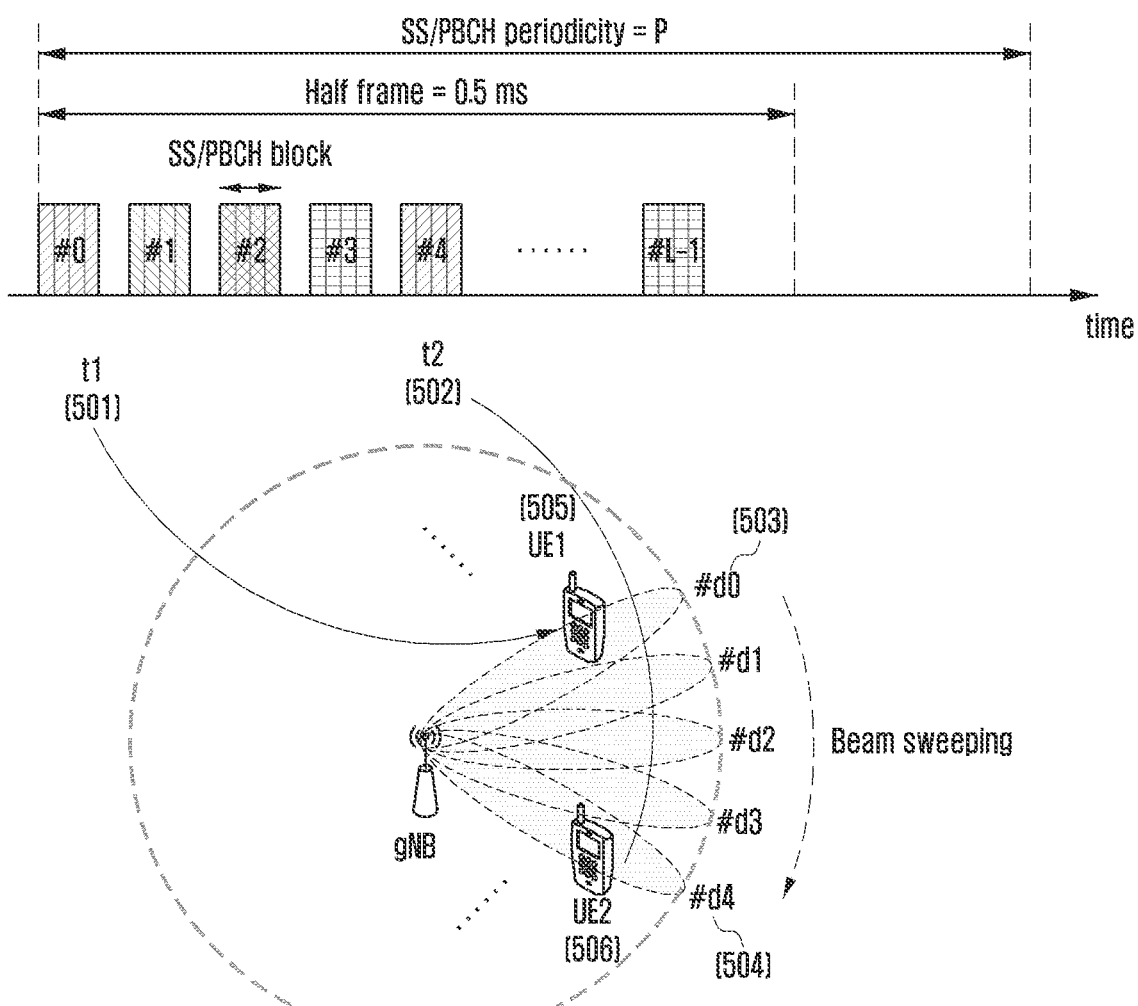
FIG. 5 illustrates a time domain mapping structure of a synchronization signal and a beam sweeping operation according to an embodiment of the disclosure.

FIG. 5 illustrates a time domain mapping structure of a synchronization signal and a beam sweeping operation according to an embodiment of the disclosure.

For the sake of explanation, the following elements may be defined.

Primary synchronization signal (PSS): A signal that serves as a reference for DL time/frequency synchronization.

Secondary synchronization signal (SSS): A signal that serves as a reference for DL time/frequency synchronization, and provides cell ID information. Additionally, the SSS may serve as a reference signal for demodulation of the PBCH.

Physical broadcast channel (PBCH): A channel that provides a master information block (MIB) which is essential system information required for transmission or reception of a data channel and a control channel of a UE. The essential system information may include search space related control information indicating radio resource mapping information of a control channel, scheduling control information for a separate data channel for transmission of system information, information such as system frame number (SFN), which is a frame unit index serving as a timing reference, and the like.

Synchronization signal/PBCH block (SS/PBCH block) or SSB includes N OFDM symbols and is configured by a combination of a PSS, an SSS, and a PBCH. In a case of a system to which beam sweeping technology is applied, the SS/PBCH block is the smallest unit to which beam sweeping is applied. In the 5G system, N=4. The base station may transmit up to L SS/PBCH blocks, and the L SS/PBCH blocks are mapped within a half frame (0.5 ms). In addition, the L SS/PBCH blocks are periodically repeated in units of a predetermined periodicity P. The periodicity P may be notified by the base station to the UE through signaling. If there is no separate signaling for the periodicity P, the UE applies a predetermined default value.

Referring to FIG. 5, it shows that beam sweeping is applied in units of SS/PBCH blocks according to the passage of time. In the example of FIG. 5, UE1 505 receives the SS/PBCH block using a beam emitted in a direction #d0 503 by beamforming applied to a SS/PBCH block #0 at time t1 501. In addition, UE2 506 receives the SS/PBCH block using a beam emitted in a direction #d4 504 by beamforming applied to a SS/PBCH block #4 at time t2 502. The UE may obtain, from the base station, an optimal synchronization signal through a beam, which is emitted in a direction in which the UE is located. For example, it may be difficult for the UE 1 505 to obtain time/frequency synchronization and essential system information from the SS/PBCH block through a beam emitted in a direction #d4 away from the location of the UE 1 505.

In addition to the initial access procedure, the UE may receive the SS/PBCH block in order to determine whether radio link quality of the current cell is maintained at a predetermined level or more. In addition, in a procedure in which the UE performs handover from a current cell to a neighboring cell, the UE may receive the SS/PBCH block of the neighboring cell in order to determine the radio link quality of the neighboring cell and obtain time/frequency synchronization of the neighboring cell.

After the UE acquires MIB and system information from the base station through an initial access procedure, the UE may perform a random access procedure to switch the link with the base station to a connected state (or RRC CONNECTED state). Upon completion of the random access procedure, the UE is switched to a connected state, and one-to-one communication is enabled between the base station and the UE. Hereinafter, a random access procedure will be described in detail with reference to FIG. 6.

Figure 6:
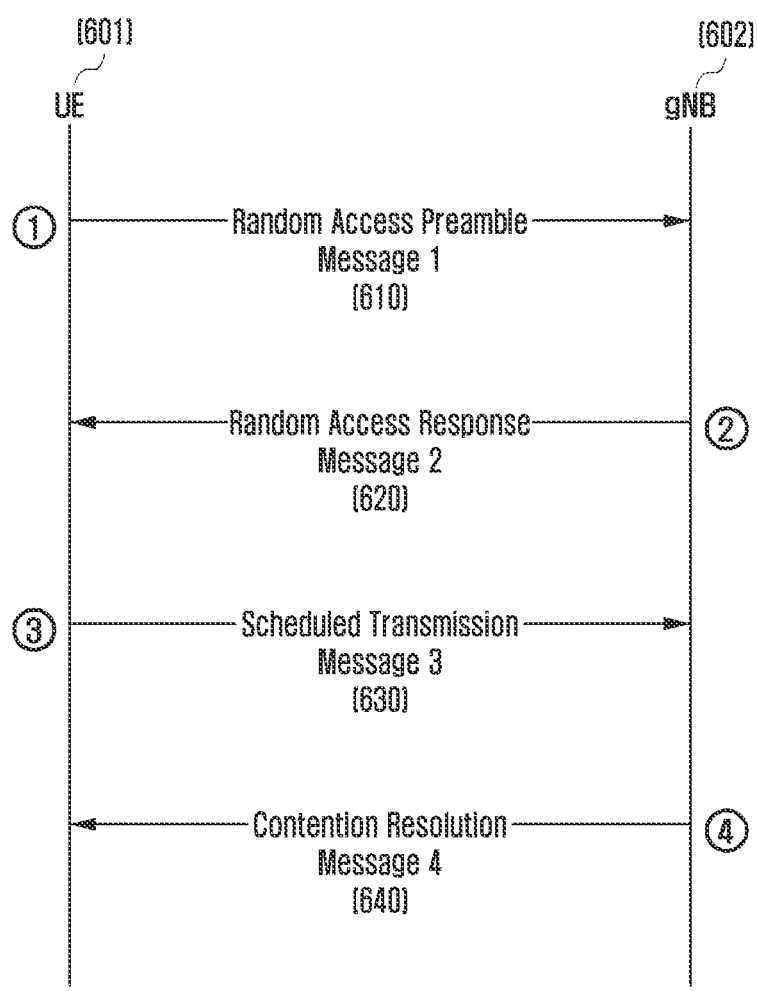
FIG. 6 illustrates a random access procedure according to an embodiment of the disclosure.

FIG. 6 illustrates a random access procedure according to an embodiment of the disclosure.

Referring to FIG. 6, as first operation 610 of the random access procedure, the UE 601 transmits a random access preamble to the base station 602. In the random access procedure, the random access preamble, which is the first message transmitted by the UE 601, may be referred to as message 1 (or msg1). The base station 602 may measure a transmission delay value between the UE 601 and the base station 602 from the random access preamble and establish uplink synchronization. The UE 601 may randomly select a random access preamble to use in a random access preamble set given by the system information in advance. In addition, the initial transmission power of the random access preamble may be determined according to a pathloss between the base station 602 and the UE 601, the pathloss measured by the UE 601. In addition, the UE 601 may transmit the random access preamble by determining the transmission beam direction of the random access preamble based on a synchronization signal received from the base station 602.

In second operation 620, the base station 602 transmits an uplink transmission timing adjustment command to the UE 601 based on the transmission delay value measured from the random access preamble received in the first operation 610. In addition, the base station 602 may transmit an uplink resource and a power control command to be used by the UE 601 as scheduling information. Control information for an uplink transmission beam of the UE 601 may be included in the scheduling information.

If the UE 601 does not receive a random access response (RAR) (or message 2 or msg2), which is scheduling information for message 3 (or msg3), from the base station 602 within a predetermined period of time in the second operation 620, the first operation 610 may be performed again. If the first operation 610 is performed again, the UE 601 increases the random access preamble transmission power by a predetermined operation and transmits the same (power ramping), thereby increasing the random access preamble reception probability of the base station 602.

In third operation 630, the UE 601 transmits uplink data (message 3) including the UE ID of the UE 601 itself to the base station 602 by using the uplink resource, which is allocated in the second operation 620, through an uplink data channel (physical uplink shared channel (PUSCH). The transmission timing of the uplink data channel for transmission of message 3 may follow the timing control command, which has been received from the base station 602 in the second operation 620. In addition, the transmission power of the uplink data channel for transmission of message 3 may be determined by considering the power ramping value of the random access preamble and the power control command, which are received from the base station 602 in second operation 620. The uplink data channel for transmission of message 3 may refer to the first uplink data signal transmitted by the UE 601 to the base station 602 after transmission of the random access preamble by the UE 601.

In fourth operation 640, when it is determined that the UE 601 has performed random access without collision with another UE, the base station 602 transmits data (message 4 or msg4) including the ID of the UE 601, which has transmitted uplink data in third operation 630, to the corresponding UE. When a signal, which has been transmitted by the base station 602 in the fourth operation 640, is received from the base station 602, the UE 601 may determine that the random access is successful. In addition, the UE 601 may transmit hybrid automatic repeat request-acknowledgment (HARQ-ACK) information indicating whether message 4 has been successfully received, to the base station 602 through a physical uplink control channel (PUCCH).

If the base station 602 fails to receive the data signal from the UE 601 because the data transmitted by the UE 601 in the third operation 630 collide with the data of the other UE, the base station 602 may not perform any more data transmission to the UE 601. Accordingly, when the UE 601 fails to receive the data, which is transmitted from the base station 602 in the fourth operation 640, within a predetermined period of time, it may be determined that the random access procedure has failed and process may start again from the first operation 610.

Upon successful completion of the random access procedure, the UE 601 is switched to a connected state, and one-to-one communication between the base station 602 and the UE 601 may be possible. The base station 602 may receive a report of UE capability information from the UE 601 in the connected state, and may adjust scheduling with reference to the UE capability information of the corresponding UE. The UE 601 may inform the base station 602 of whether the UE 601 itself supports a predetermined function, the maximum allowable value of the function supported by the UE 601, and the like, through the UE capability information. Accordingly, the UE capability information reported by each UE 601 to the base station 602 may be a different value for each terminal.

As an example, the UE 601 may report UE capability information including at least a part of the following control information, as the UE capability information, to the base station 602.

Control information related to a frequency band supported by the UE.

Control information related to a channel bandwidth supported by the UE.

Control information related to a maximum modulation method supported by the UE.

Control information related to the maximum number of beams supported by the UE.

Control information related to the maximum number of layers supported by the UE.

Control information related to channel state information (CSI) reporting supported by the UE.

Control information relating to whether the UE supports frequency hopping.

Bandwidth related control information when CA is supported.

Control information relating to whether cross carrier scheduling is supported when CA is supported.

Figure 7:
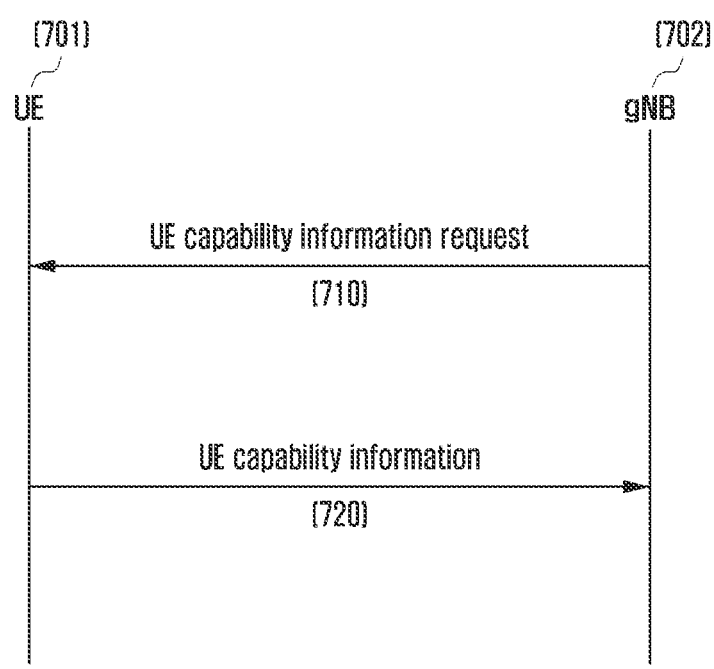
FIG. 7 illustrates a procedure in which a UE reports UE capability information to a base station according to an embodiment of the disclosure.

FIG. 7 illustrates a procedure in which a UE reports UE capability information to a base station according to an embodiment of the disclosure.

Referring to FIG. 7, in operation 710, a base station 702 may transmit a UE capability information request message to a UE 701. In response to a request for UE capability information from the base station 702, the UE 701 transmits UE capability information to the base station 702 in operation 720.

Hereinafter, a scheduling method in which a base station transmits downlink data to a UE or instructs the UE to transmit uplink data will be described.

Downlink control information (DCI) is control information transmitted by a base station to a UE through downlink, and may include downlink data scheduling information or uplink data scheduling information regarding a predetermined UE. In general, the base station may independently perform channel coding of DCI for each UE, and then may transmit the channel-coded DCI to each terminal through a PDCCH, which is a downlink physical control channel.

The base station may operate the DCI for a UE to be scheduled, by applying a certain DCI format determined depending on whether it is scheduling information about downlink data (e.g., downlink assignment) or scheduling information about uplink data (e.g., uplink grant), whether spatial multiplexing using multiple antennas is applied, whether it is DCI for power control, or the like.

The base station may transmit, to the UE, downlink data through a PDSCH which is a physical channel for downlink data transmission. The base station may transmit scheduling information, such as a specific mapping position in the time and frequency domain of the PDSCH, a modulation scheme, HARQ-related control information, and power control information, to the UE through DCI related to scheduling information for downlink data in the DCI that is transmitted through the PDCCH.

The UE may transmit uplink data through a PUSCH which is a physical channel for uplink data transmission. The base station may transmit scheduling information, such as a specific mapping position in the time and frequency domain of the PUSCH, a modulation scheme, HARQ-related control information, and power control information, to the UE through DCI related to scheduling information for uplink data in the DCI that is transmitted through the PDCCH.

As described above, in order to achieve ultra-high speed data service up to several Gbps in the 5G system, signal transmission and reception of ultra-wide bandwidths of tens to hundreds of MHz or several GHz may be supported. The ultra-wide bandwidth signal transmission/reception may be supported through a single component carrier (CC) or a CA technology combining multiple component carriers. When a mobile communication operator fails to secure, as a single component carrier, a frequency with sufficient bandwidth to provide ultra-high speed data services, the CA technology may increase the total frequency bandwidth by combining each component carrier with a relatively small bandwidth size, and resulting in ultra-high speed data services.

Figure 8:
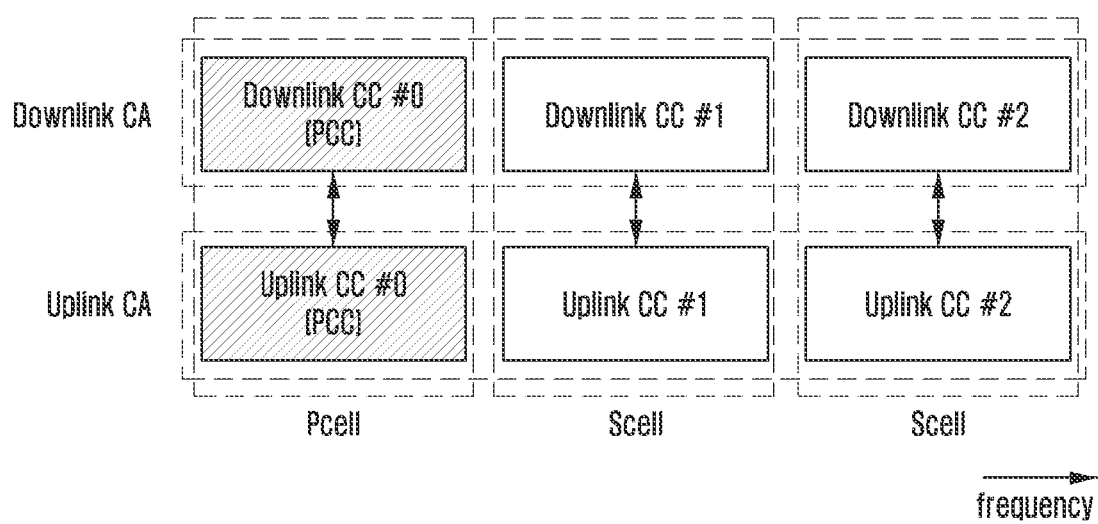
FIG. 8 illustrates the concept of CA according to an embodiment of the disclosure.

FIG. 8 illustrates the concept of CA according to an embodiment of the disclosure.

FIG. 8 shows an example of configuring a 5G system by combining three component carriers with regard to each case of uplink and downlink. In a CA system, each component carrier may be divided into a primary cell (PCell) or a secondary cell (SCell) and operated. The PCell provides basic radio resources to a UE and may refer to a cell that serves as a reference for performing operations such as initial access and handover of the UE. The PCell may be configured by a downlink primary frequency (or primary component carrier (PCC)) and an uplink primary frequency. The UE may transmit uplink control information (UCI), which is uplink control information including HARQ ACK/NACK for feeding back whether there is an error in data received from the base station or CSI indicating the channel state between the base station and the UE, through a PUCCH which is an uplink control channel, and the PUCCH may be transmitted through the PCell. Further, the SCell is a cell, which provides additional radio resources to the UE, together with the PCell, and may be configured by a downlink secondary frequency (or secondary component carrier (SCC)) and an uplink secondary frequency or may be configured as a downlink secondary frequency. Each component carrier is configured independently of each other, and the downlink CA and the uplink CA may be applied independently of each other. For example, CA combining a component carrier of a 100 MHz bandwidth and two component carriers of a 50 MHz bandwidth may be applied to downlink, and only one component carrier of 100 MHz bandwidth may be applied to uplink (that is, CA may not be applied.). In the disclosure, unless otherwise stated, a cell and a component carrier may be interchangeably used without distinction. CA-related configuration such as which component carriers to combine, how many component carriers to combine, or control information related to the bandwidth of each component carrier may be notified by the base station to the UE through signaling.

In the CA system, independent control information and data may be generated and transmitted for each component carrier. Specifically, a method for scheduling a UE in the CA system may be classified into two types: a self-carrier scheduling method and a cross carrier scheduling method. In the disclosure, self-carrier scheduling may refer to, for example, that a serving cell is scheduled by its own PDCCH, and cross carrier scheduling may refer to, for example, that a serving cell is scheduled by a PDCCH of another cell (scheduling cell). In the disclosure, self-carrier scheduling may be abbreviated as self-scheduling.

Figure 9:
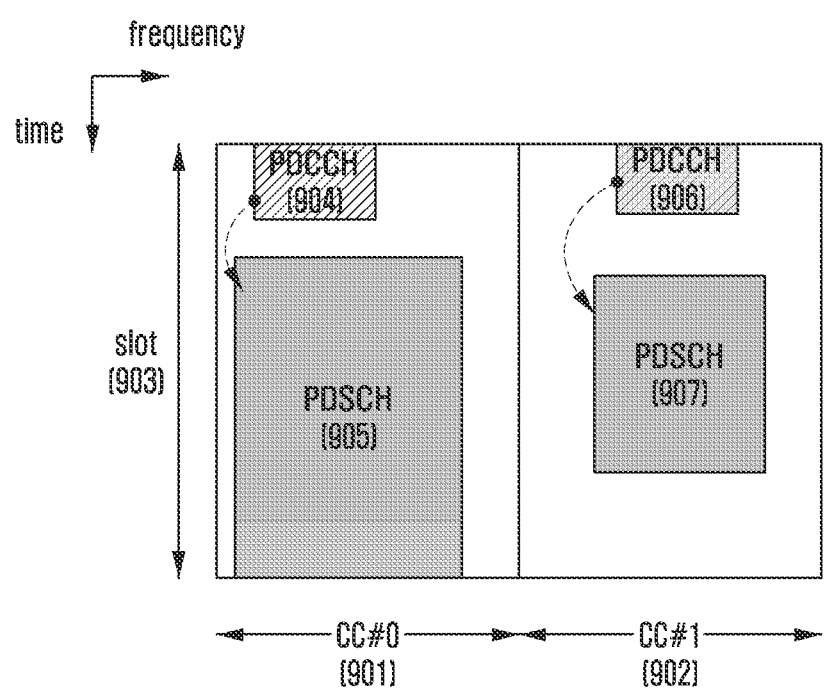
FIG. 9 illustrates a self-carrier scheduling method in CA according to an embodiment of the disclosure.

FIG. 9 illustrates a self-carrier scheduling method in CA according to an embodiment of the disclosure.

Referring to FIG. 9, it is assumed that a 5G system in which two downlink component carriers (CC #0 901 and CC #1 902) are aggregated. In the example of FIG. 9, a base station may transmit downlink data channels (PDSCHs) (e.g., 905 and 907) to a predetermined UE through CC #0 901 and CC #1 902 in a slot (903). A PDCCH 904 for scheduling the PDSCH 905 of CC #0 901 may be transmitted to a UE through CC #0 901, and a PDCCH 906 for scheduling the PDSCH 907 of CC #1 may be transmitted to the UE through CC #1 902. As described above, a scheduling method in which a data channel and a control channel for scheduling the data channel are transmitted in the same carrier or the same cell may be referred to as self-carrier scheduling.

Figure 10:
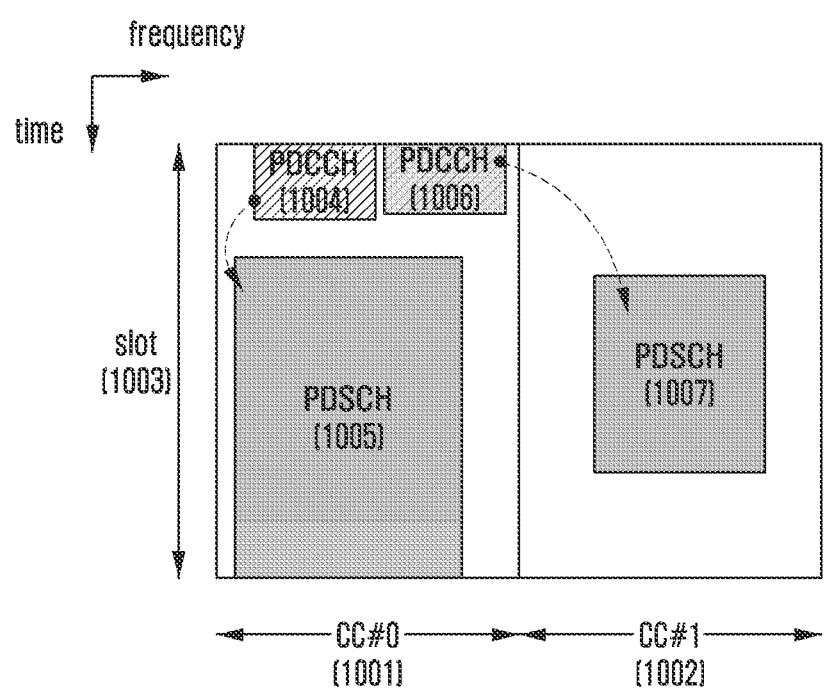
FIG. 10 illustrates a cross carrier scheduling method in CA according to an embodiment of the disclosure.

FIG. 10 illustrates a cross carrier scheduling method in CA according to an embodiment of the disclosure.

Referring to FIG. 10, it illustrates a system in which CA is applied using two downlink component carriers (CC #0 1001 and CC #1 1002). In FIG. 10, a base station may transmit downlink data channels (PDSCHs) (e.g., 1005 and 1007) to a predetermined UE through CC #0 1001 and CC #1 1002 in a slot (1003). A PDCCH 1004 for scheduling the PDSCH 1005 of CC #0 1001 and a PDCCH 1006 for scheduling the PDSCH 1007 of CC #1 1002 may be both transmitted to the UE through CC #0 1001. That is, in a case of CC #1 1001, a data channel and a control channel for scheduling the data channel may be transmitted in different carriers or different cells. Such a scheduling method may be referred to as cross carrier scheduling.

FIGS. 9 and 10 describe the downlink CA technology, the examples of FIGS. 9 and 10 may be similarly applied to the uplink CA technology.

Cross carrier scheduling may obtain the following effects compared to self-carrier scheduling.

1) Control channel offloading: when a predetermined carrier does not have sufficient radio resources for control channel transmission, the control channel may be transmitted through a separate carrier having relatively sufficient radio resources. For example, in a case of FIG. 10, when the bandwidth of CC #1 is 20 MHz and the bandwidth of CC #0 is 100 MHz, CC #0 is relatively sufficient as a radio resource for control channel transmission.

2) Control channel interference management: Relatively strong interference may occur in a predetermined carrier due to factors of the surrounding environment, frequency characteristics, and the like. The interference may deteriorate the transmission/reception performance of the control channel. The control channel transmission/reception performance deterioration may be avoided by transmitting the control channel through a carrier having a relatively low interference effect. On the other hand, since the data channel may be recovered through HARQ operation even if a transmission/reception error occurs, there is less problem of performance deterioration due to interference compared to that of the control channel.

Hereinafter, dynamic spectrum sharing (DSS) will be described. A scenario in which LTE and 5G systems are deployed and operated in the same frequency band or in overlapping frequency bands in a frequency domain may be referred to as DSS or LTE-NR coexistence. In a system of operating DSS, whether to schedule LTE or 5G to the UE may be adjusted according to changes in LTE traffic and 5G traffic. The DSS may be used to accelerate the proliferation of 5G without additional frequency allocation by maximizing existing frequencies at the initial stage of 5G system installation when LTE traffic gradually decreases and 5G traffic gradually increases. The communication service provider may efficiently use frequencies, which have already been secured, without wasting through DSS operation.

Figure 11A:
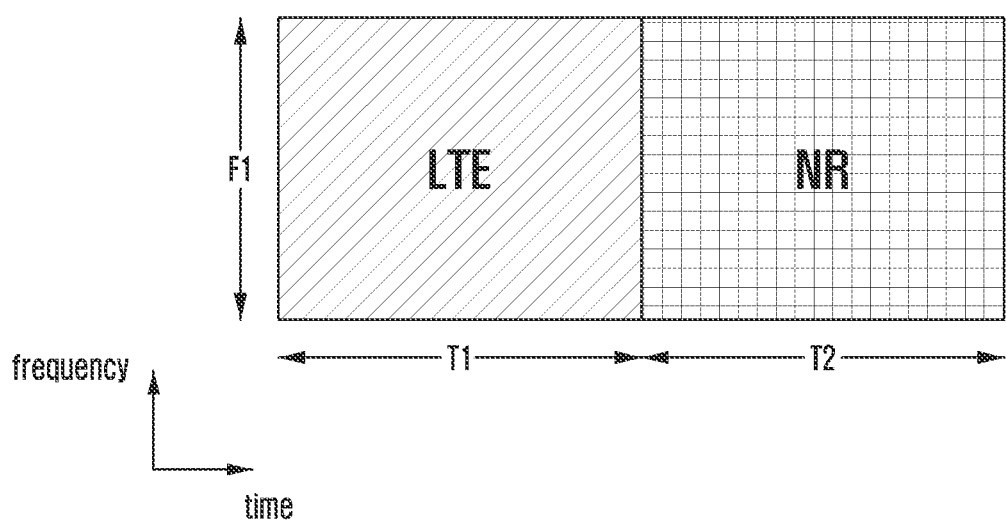
FIG. 11A shows an example in which long-term evolution (LTE) and 5G systems overlap in the same frequency band according to an embodiment of the disclosure.
Figure 11B:
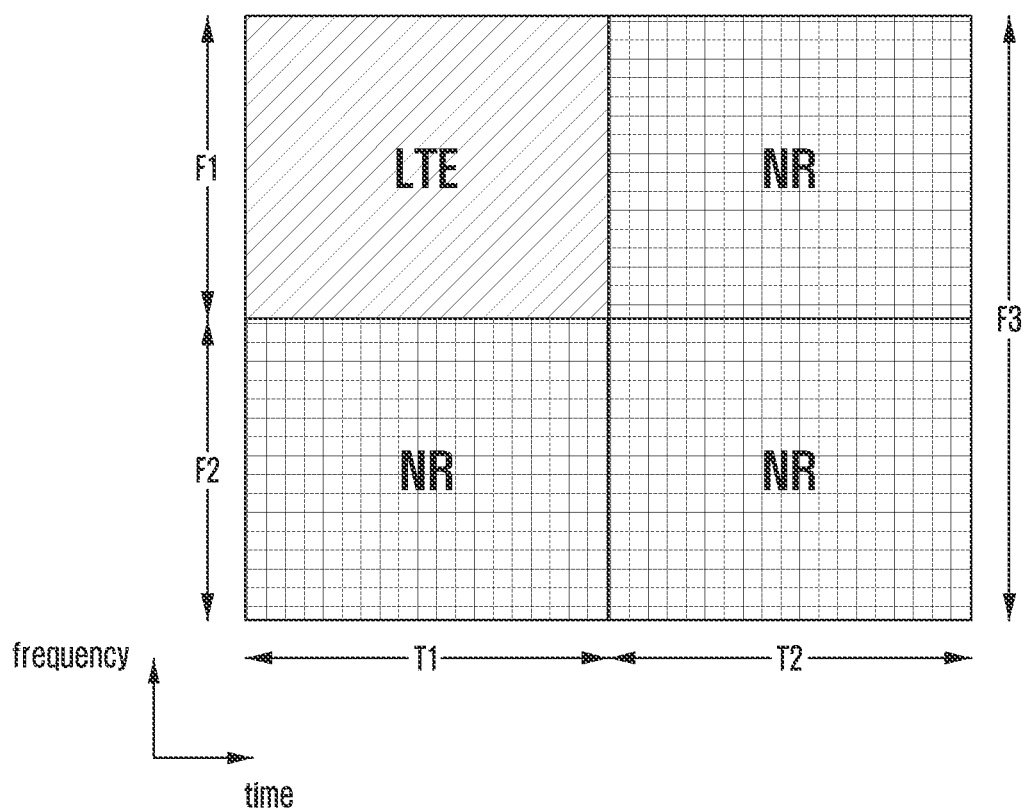
FIG. 11B shows an example in which LTE and 5G systems partially overlap in a frequency domain according to an embodiment of the disclosure.

FIG. 11A illustrates the concept of DSS, and FIG. 11B illustrates the concept of DSS according to various embodiments of the disclosure.

FIG. 11A shows an example in which LTE and 5G systems overlap in the same frequency band.

Referring to FIG. 11A, a base station may determine a time in which LTE scheduling is to be performed, and a time in which 5G scheduling is to be performed, according to the distribution of LTE traffic and 5G traffic. FIG. 11A illustrates an example in which LTE scheduling is performed during T1 time period and 5G scheduled is performed during T2 time period.

FIG. 11B shows an example in which LTE and 5G systems partially overlap in a frequency domain according to an embodiment of the disclosure.

Referring to FIG. 11B, it shows an example in which LTE is scheduled in the F1 frequency domain of the T1 time period and 5G is scheduled in the F2 frequency domain of the T1 time period. In addition, FIG. 11B shows an example in which 5G is scheduled in the F3 (=F1+F2) frequency domain during the T2 time period. Although LTE and 5G share time/frequency resources in both FIGS. 11A and 11B, deterioration in transmission/reception performance may be minimized by preventing LTE and 5G from being collided in time/frequency resources at a predetermined moment.

In order to explain avoidance of collision between LTE and 5G in the above-described DSS system, a downlink radio resource structure of the LTE system will be described with reference to FIG. 12 first.

Figure 12:
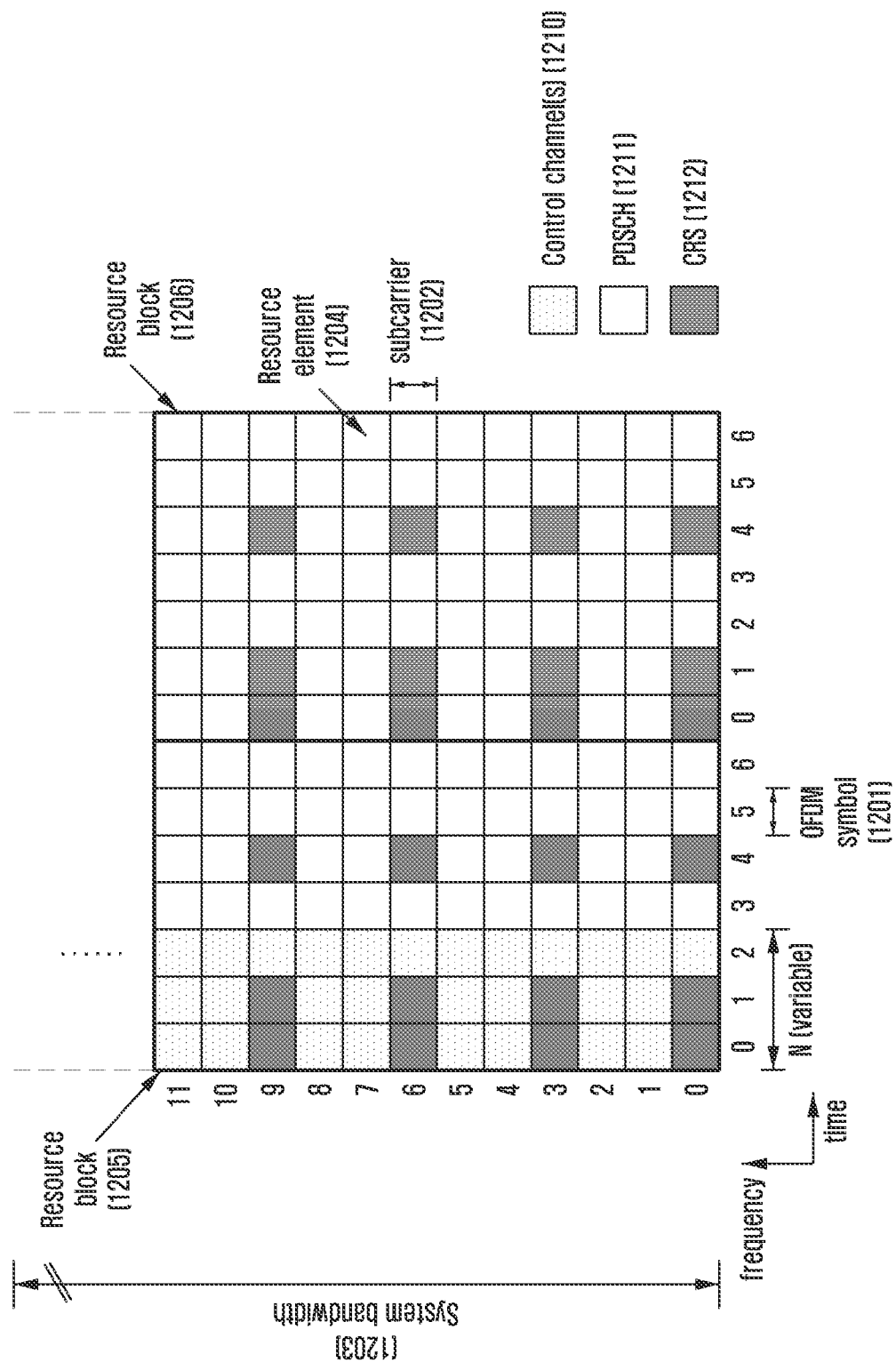
FIG. 12 illustrates a basic structure of a time-frequency resource domain of an LTE system according to an embodiment of the disclosure.

FIG. 12 illustrates a basic structure of a time-frequency resource domain of an LTE system according to an embodiment of the disclosure. That is, FIG. 12 shows a basic structure of a time-frequency domain, which is a radio resource domain in which data or a control channel is transmitted through a downlink of the LTE system, and a mapping relationship between a downlink physical channel and a signal.

The LTE system is basically similar to the 5G system described in FIG. 1, but unlike the 5G system, LTE generally has a fixed subcarrier spacing of 15 kHz regardless of a frequency band, and includes a signal and a control channel for regularly occupying time-frequency resources.

Referring to FIG. 12, a horizontal axis represents a time domain, and a vertical axis represents a frequency domain. The minimum transmission unit in the time domain is an OFDM symbol 1201, and $N_{symb}^{DL}$ (generally $N_{symb}^{DL}=7$) OFDM symbols are gathered to configure one slot 106, two slots are gathered to configure one subframe, and 10 subframes are gathered to configure a radio frame of 10 ms length. The minimum transmission unit in the frequency domain is a subcarrier 1202, and a total system transmission bandwidth 1203 includes $N_{BW}$ subcarriers in total. $N_{BW}$ may have a value proportional to the system transmission band. The basic unit of a resource in a time-frequency domain is a resource element (RE) 1204, and may be indicated by an OFDM symbol index and a subcarrier index. A resource block (RB) (or a physical resource block (PRB)) 1205 or 1206 may be defined by $N_{symb}^{DL}$ successive OFDM symbols in the time domain and $N_{sc}^{RB}$ (generally $N_{sc}^{RB}=12$) OFDM successive subcarriers in the frequency domain. Accordingly, one RB is configured by ($N_{symb}^{DL} \times N_{sc}^{RB}$) REs.

An LTE downlink control channel 1210 may be mapped to the first N OFDM symbols in a subframe in the time domain, and may be transmitted to the UE by being mapped over the entire system transmission band in the frequency domain. The time-frequency region to which the LTE downlink control channel is mapped may be referred to as a "control region". A base station may vary the value of N for each subframe according to the amount of control information to be transmitted to the current subframe. In general, the N={1, 2, 3}. The control channel may include a physical control format indicator channel (PCFICH) including an indicator indicating the value of N, a PDCCH including uplink or downlink scheduling information, and a physical HARQ indicator channel (PHICH) including a HARQ ACK/NACK signal indicating whether the reception of uplink data is successful. The PCFICH may be mapped to the first symbol among the first N OFDM symbols of the subframe, and the PDCCH may be mapped over the N OFDM symbols. The PHICH may be mapped across OFDM symbols according to a separate configuration indicated by the base station within the N OFDM symbols.

A PDSCH 1211, which is an LTE downlink physical data channel, may be mapped during the remaining subframe period, in which the downlink control channel is not transmitted, in a time domain and mapped to a frequency domain indicated by the LTE PDCCH in a frequency domain, and transmitted.

The base station may transmit a reference signal (hereinafter referred to as RS) allowing a UE to refer to measure the downlink channel state or to refer to the demodulation of the PDSCH. The reference signal is also called a pilot signal. The RS may be distinguished as a cell-specific reference signal (CRS) 1212 that may be jointly received by UEs in a cell, a channel state information-reference signal (CSI-RS) that supports multiple antennas but uses relatively few resources per antenna port compared to that of the CRS, and a demodulation reference signal (DMRS) which the UE refers to when demodulating a PDSCH scheduled for a predetermined UE. In FIG. 12, only the CRS is shown for convenience.

The DMRS for the PDSCH may be mapped to a pre-arranged position in the time-frequency domain of the PDSCH scheduled by the base station. In a case of the CSI-RS, the base station may control and manage a transmission period and a mapping position in the time-frequency domain. On the other hand, in a case of the CRS, the DMRS for the PDSCH is repeatedly mapped to the RE illustrated in FIG. 12 and transmitted for every subframe over the entire system transmission band.

The term "antenna port" is a logical concept, and the RS is defined for each antenna port and is operated to measure the channel state for each antenna port. If the same RS is transmitted from multiple physical antennas, the UE cannot distinguish respective physical antennas and recognizes the physical antennas as one antenna port.

The term "CRS" is a cell common signal, and the UE may measure the CRS and perform the following operation.

1) The UE determines a downlink channel state from the CRS and then reports the same to the base station to support base station scheduling.

2) The UE uses the CRS as a reference signal for demodulation of the PDSCH received from the base station.

3) The UE determines whether a radio link between the base station and the UE is maintained as a predetermined level or more.

4) The UE supports the handover determination of the base station by measuring the CRS of a neighboring cell and reporting the measured CRS to the base station.

Therefore, irrespective of whether or not PDSCH transmission to the UE occurs within a predetermined subframe, the base station may transmit the CRS to a predetermined position for every subframe.

As described above, due to the LTE "control region" and LTE CRS, which regularly and frequently occupy the time-frequency domain in the LTE system, a method for avoiding collision between LTE and 5G is required during transmission of 5G signals through the DSS. Hereinafter, a method for avoiding collision between LTE and 5G signals in a DSS system is described with reference to FIG. 13.

Figure 13:
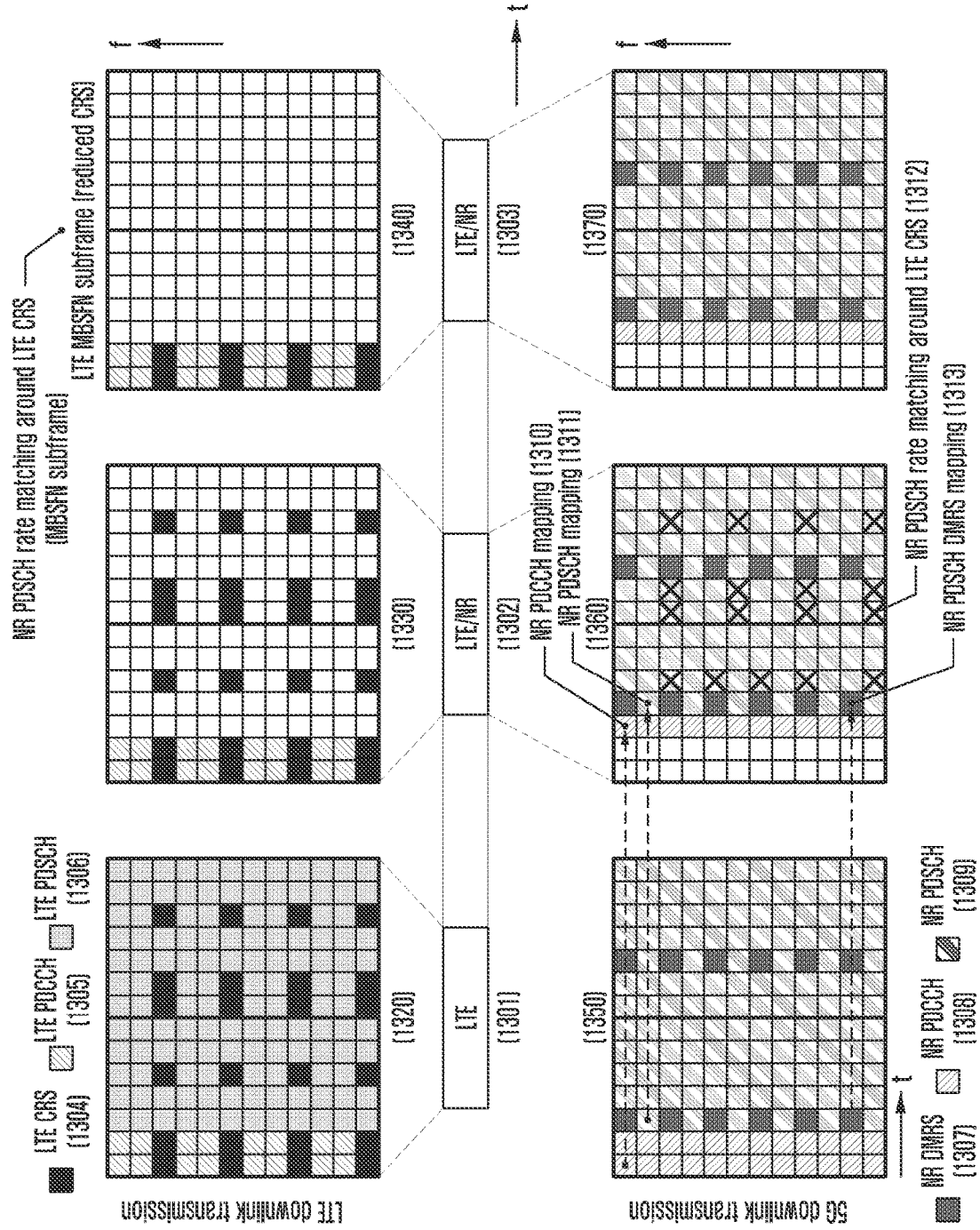
FIG. 13 illustrates a method for avoiding collision between LTE and 5G signals in a dynamic spectrum sharing (DSS) system according to an embodiment of the disclosure.

FIG. 13 illustrates a method for avoiding collision between LTE and 5G signals in a DSS system according to an embodiment of the disclosure.

Referring to FIG. 13, the horizontal axis represents a time domain and the vertical axis represents a frequency domain, respectively. In the example of FIG. 13, it is assumed that LTE and a 5G system overlap each other by using the same frequency band in the frequency domain. Further, it is assumed that both the LTE and 5G system use the same subcarrier spacing of 15 kHz. For convenience of explanation, distinction may be made such that "LTE" is added with regard to a channel/signal of the LTE system and "NR" is added to a channel/signal of the 5G system. For example, a PDCCH for LTE may be referred to as an LTE PDCCH, and a PDCCH for 5G may be referred to as an NR PDCCH.

Reference numeral 1320 denotes a basic structure of a downlink time-frequency domain of the LTE system described in FIG. 12, and indicates that the base station transmits an LTE downlink signal during a time period of reference numeral 1301 (1 subframe with reference to LTE). The LTE downlink signal may include an LTE CRS 1304, an LTE PDCCH 1305, and an LTE PDSCH 1306. The LTE PDCCH 1305 may include scheduling information for the LTE PDSCH 1306. In reference number 1320, the LTE "control region" is exemplified by the first 2 symbols in the subframe.

Reference numeral 1350 denotes a basic structure of the time-frequency domain of the 5G system described in FIG. 1, and indicates that an NR PDCCH 1308, an NR PDSCH 1309, and NR DMRS 1307 for NR PDSCH are mapped thereto. In reference number 1350, the NR PDCCH 1308 may be mapped to the first two symbols in a slot, and the NR PDSCH 1309 scheduled by the NR PDCCH 1308 may be mapped during the remaining period in the slot. In addition, the NR DMRS 1307 for the NR PDSCH 1309 may be mapped to the third symbol and the 10th symbol in the slot.

In the example of FIG. 13, the base station may schedule and transmit the LTE PDSCH according to the structure of reference number 1320 to an LTE UE during the time period of reference number 1301. Referring to FIG. 13, there may be no signal transmitted by the base station to a 5G UE during the time period of reference number 1301. During the time period of reference number 1302 and reference number 1303, the NR PDSCH 1309 may be scheduled and transmitted to the 5G UE according to the structure of reference number 1360 and reference number 1370, respectively. In addition, during the time period of reference number 1302 and reference number 1303, the base station may transmit the LTE CRS and the LTE PDCCH according to the structures of reference numbers 1330 and 1340, respectively. There may be no LTE PDSCH transmission. Reference number 1340 denotes an LTE MBSFN subframe, and has a feature that the overhead of LTE CRS is relatively small compared to that of the general subframes of reference numbers 1320 and 1330.

1) Method 1 for Avoiding Collision Between LTE and 5G Signals: LTE CRS Rate Matching.

In a DSS system, when transmitting a 5G downlink signal to a 5G UE, a base station maps the 5G downlink signal by avoiding the location of the LTE CRS and transmits (LTE CRS rate matching). In addition, the base station notifies the 5G UE of LTE CRS configuration information, so that the 5G UE may receive the 5G downlink signal at an accurate location. The LTE CRS configuration information may include at least some of the following information. The UE may know the mapping position of the LTE CRS from the LTE CRS configuration information.

v-Shift (0, 1, 2, 3, 4, 5): mapping offset of LTE CRS from the RB boundary in the frequency domain, and expressed in RE units.

nrofCRS-Ports (1, 2, 4): the number of LTE CRS antenna ports.

carrierFreqDL (0 . . . 16383): the center frequency of the LTE carrier.

carrierBandwidthDL (6, 15, 25, 75, 100): LTE carrier bandwidth, and expressed in RB units.

mbsfn-SubframeConfigList (period, offset): LTE MBSFN subframe configuration information, and including the configuration period and timing offset of the LTE MBSFN subframe.

In the example of FIG. 13, when there is no downlink data to be transmitted to the LTE UE by the base station during the period of reference number 1302, or when the base station determines that scheduling for the 5G UE is prioritized, the base station may allocate the available radio resources to the 5G UE. As described above, even if there is no LTE PDSCH to be transmitted to the LTE UE during a predetermined LTE subframe period, the LTE system maps the LTE CRS to a predetermined location and transmits the same. Therefore, when the base station is to provide a 5G service to the 5G UE during the period of reference numeral 1302 (e.g., NR PDSCH transmission), the base station maps the NR PDSCH to a time-frequency resource other than the mapping position of the LTE CRS and transmits the mapped NR PDSCH. For example, a region indicated by "x" of reference number 1312 is an RE in which the LTE CRSs 1304 of reference number 1320 and reference number 1330 are transmitted, and the base station maps the NR PDSCH to a region other than the corresponding RE and transmits the mapped NR PDSCH. Since the UE needs to know the location of the LTE CRS to receive the NR PDSCH except for the RE when receiving the NR PDSCH, the UE obtains LTE CRS configuration information from the base station through signaling.

2) Method 2 for Avoiding Collision Between LTE and 5G Signals: NR PDCCH Mapping Control.

A time-frequency resource to which the NR PDCCH, which is the downlink control channel of the 5G system, is mapped may be referred to as a control resource set (CORESET). The CORESET may be configured in all or some frequency resources of a bandwidth supported by the UE in the frequency domain. In the time domain, one or a plurality of OFDM symbols may be configured, which may be defined as a control resource set duration (CORESET duration). The base station may configure one or a plurality of CORESETs in a UE through higher layer signaling (e.g., system information, MIB, and RRC signaling). Configuring the CORESET to the UE may refer to providing information such as a CORESET identity, frequency-related information including the frequency position and the like of CORESET, and time-related information including the symbol length and the like of CORESET. The information provided by the base station to the UE in order to configure the CORESET may include at least some of the information included in Table 4.

TABLE 4

```
ControlResourceSet ::=              SEQUENCE {
    controlResourceSetId                ControlResourceSetId,
        (CORESET Identity)
    frequencyDomainResources            BIT STRING (SIZE (45)),
        (Frequency domain resource)
    duration                            INTEGER (1..maxCoReSetDuration),
        (CORESET duration)
    cce-REG-MappingType                 CHOICE {
        (CCE-to-REG mapping type)
        interleaved                     SEQUENCE {
            reg-BundleSize              ENUMERATED {n2, n3, n6},
                (REG bundel size)
            interleaverSize                 ENUMERATED {n2, n3, n6},
                (Interleaver size)
            shiftIndex
INTEGER(0..maxNrofPhysicalResourceBlocks-1)   OPTIONAL -- Need S
                (Interleaver shift)
        },
        nonInterleaved                  NULL
    },
    precoderGranularity                     ENUMERATED {sameAsREG-bundle,
allContiguousRBs},
        (Precoding unit)
        tci-StatesPDCCH-ToAddList               SEQUENCE(SIZE (1..maxNrofTCI-
StatesPDCCH)) OF TCI-StateId OPTIONAL, -- Cond NotSIB1-initialBWP
            (QCL configuation information)
        tci-StatesPDCCH-ToReleaseList           SEQUENCE(SIZE  (1..maxNrofTCI-
StatesPDCCH)) OF TCI-StateId OPTIONAL, -- Cond NotSIB1-initialBWP
            (QCL configuation information)
        tci-PresentInDCI                        ENUMERATED {enabled}
OPTIONAL, -- Need S
            (QCL indicator configuration information in DCI)
        pdcch-DMRS-ScramblingID                 INTEGER (0..65535)
OPTIONAL, -- Need S
            (PDCCH DMRS scrambling identity)
}
```

The CORESET may be configured by $N_{RB}^{CORESET}$ in the frequency domain and may be configured by $N_{symb}^{CORESET} \in \{1,2,3\}$ symbols in the time domain. The NR PDCCH may be configured by one or a plurality of control channel elements (CCEs). One CCE may be configured by 6 resource element groups (REGs), and a REG may be defined as 1 RB during 1 OFDM symbol. REGs in one CORESET may be indexed starting from REG index 0 in the time-first order from the lowest RB of the first OFDM symbol of the CORESET.

In 5G, an interleaved method and a non-interleaved method may be supported as a transmission method for the NR PDCCH. The base station may configure in the UE whether to perform interleaving transmission or non-interleaving transmission for each CORESET through higher layer signaling. Interleaving may be performed in units of REG bundles. A REG bundle may be defined as a set of one or a plurality of REGs. Based on the configuration of whether interleaving or non-interleaving transmission occurs, which is received from the base station, the UE may determine a CCE-to-REG mapping method in the corresponding CORESET according to the manner shown in Table 5 below.

TABLE 5

The CCE-to-REG mapping for a control-resource set can be interleaved or non-interleaved and is described by REG bundles:
- REG bundle i is defined as REGs $\{iL, iL+1, \ldots, iL+L-1\}$ where L is the REG bundle size, $i = 0, 1, \ldots, N_{REG}^{CORESET}/L - 1$, and $N_{REG}^{CORESET} = N_{RB}^{CORESET} N_{symb}^{CORESET}$ is the number of REGs in the CORESET
- CCE j consists of REG bundles $\{f(6j/L), f(6j/L+1), \ldots, f(6j/L+6/L-1)\}$ where $f(\cdot)$ is an interleaver For non-interleaved CCE-to-REG mapping, $L = 6$ and $f(x) = x$.
For interleaved CCE-to-REG mapping, $L \in \{2,6\}$ for $N_{symb}^{CORESET} = 1$ and $L \in \{N_{symb}^{CORESET}, 6\}$ for $N_{symb}^{CORESET} \in \{2,3\}$. The interleaver is defined by $$f(x) = (rC + c + n_{shift}) \mod (N_{REG}^{CORESET}/L)$$
$$x = cR + r$$
$$r = 0, 1, \ldots, R - 1$$
$$c = 0, 1, \ldots, C - 1$$
$$C = N_{REG}^{CORESET}/(LR)$$

where $R \in \{2,3,6\}$.

In the 5G system, the base station may notify the UE of a symbol in a slot to which the NR PDCCH is mapped and configuration information such as the transmission period through signaling.

In the example of FIG. 13, in a case of reference number 1350, the NR PDCCH 1308 may be mapped to the first two symbols in a slot and transmitted. During a time period of reference number 1302 in which LTE and 5G coexist, the NR PDCCH is mapped to the third symbol in a slot (indicated by reference numeral 1310) by avoiding a time-frequency resource occupied by the LTE PDCCH and the LTE CRS, according to reference number 1360, and thus collision between LTE and 5G may be avoided.

3) Method 3 for Avoiding Collision Between LTE and 5G Signals: Control Location of DMRS for NR PDSCH.

In the 5G system, the base station configures the mapping position of DMRS for NR PDSCH and notifies the UE of the configured DMRS mapping position via signaling. For example, in a case of reference number 1350 of FIG. 13, DMRS for NR PDSCH may be mapped to the third and 10th symbols in a slot. During the time period of reference number 1302 in which LTE and 5G coexist, the DMRS for NR PDSCH may be mapped to the fourth and 10th symbols in a slot (indicated by reference numeral 1313) by avoiding time-frequency resources occupied by the LTE PDCCH and the LTE CRS, according to reference number 1360, and thus collision between LTE and 5G may be avoided.

4) Method 4 for Avoiding Collision Between LTE and 5G Signals: NR PDSCH Mapping Control.

In the 5G system, the base station notifies of the time-frequency resource information of an NR PDSCH through an NR PDCCH for scheduling the NR PDSCH.

For example, in a case of reference number 1350 of FIG. 13, the NR PDSCH may be mapped over from the third symbol to the 14th symbol in a slot. During the time period of reference number 1302 in which LTE and 5G coexist, the NR PDSCH may be mapped over from the fourth symbol to the 14th symbol in a slot (indicated by reference numeral 1311) by avoiding a time-frequency resource occupied by an LTE PDCCH, according to reference number 1360, and thus collision between LTE and 5G may be avoided. Collision between NR PDSCH and LTE CRS may be avoided through the method 1 for avoiding collision between LTE and 5G signals.

5) Method 5 for Avoiding Collision Between LTE and 5G Signals: LTE MBSFN Subframe Control.

By configuring MBSFN with regard to a predetermined subframe in the LTE system (LTE MBSFN subframe), the mapping frequency of LTE CRS within the LTE MBSFN subframe is lowered and the time domain size of the LTE "control region" may be limited. That is, the LTE CRS mapping symbol of the LTE MBSFN subframe is limited to within the first 2 symbols in a subframe, and the time domain size of the LTE "control region" of the LTE MBSFN subframe may be limited within the first 2 symbols in a subframe. Reference number 1340 exemplifies that the time period 1303 is configured as the LTE MBSFN subframe of the LTE system. Therefore, for the coexistence of LTE and 5G in the time period 1303, 5G signals need to be mapped by avoiding the LTE CRS and LTE "control region", which are mapped over the first 2 symbols of the LTE MBSFN subframe. That is, according to reference number 1370, by avoiding the time-frequency resource occupied by the LTE PDCCH, the NR PDCCH is mapped to the third symbol in a slot, the DMRS for the NR PDSCH is mapped to the fourth symbol and the 10th symbols in a slot, and the NR PDSCH is mapped over from the the fourth symbol to the 14th symbol, so that collision between the LTE and 5G signals may be avoided.

6) Method 6 for Avoiding Collision Between LTE and 5G Signals: 5G Uplink Transmission Frequency Shift.

The frequency domain mapping of a 5G uplink signal is deviated from the frequency domain mapping of an LTE uplink signal by ½ subcarrier spacing, with reference to the subcarrier spacing of 15 kHz, unless there is a separate configuration. Therefore, for the coexistence of LTE and 5G signals in the uplink during the time periods of reference numerals 1302 and 1303 of FIG. 13, the frequency domain mapping of the 5G uplink signal may be performed by shifting by ½ subcarrier spacing (=7.5 kHz). The base station notifies the UE that the mapping of the uplink signal is shifted by 7.5 kHz in the frequency domain through signaling.

Since the DSS system is a method in which LTE and 5G share time-frequency resources, if there is excessive 5G traffic, radio resources for scheduling LTE UEs may be insufficient so as to cause scheduling restrictions. On the contrary, when LTE traffic is excessively large, scheduling restrictions may occur due to insufficient radio resources for scheduling the 5G UE. In particular, due to the limitation of the NR PDCCH resource mapping scheme, radio resources for the NR PDCCH may be relatively insufficient compared to the NR PDSCH.

In the following, a search space of the NR PDCCH will be described. The number of CCEs required for transmission of the NR PDCCH may be 1, 2, 4, 8, or 16 according to the aggregation level (AL). A different number of CCEs may be used to implement link adaptation of the downlink control channel. For example, in case that AL=L, one downlink control channel may be transmitted through L CCEs. The UE performs blind decoding to detect a signal in a state in which the UE does not know information about the downlink control channel, and to this end, a search space indicating a set of CCEs may be defined. The search space is a set of downlink control channel candidates including CCEs that the UE has to attempt to decode at a given AL. Since there are various ALs that make one bundle of 1, 2, 4, 8, or 16 CCEs, the UE may have multiple search spaces. A search space set may be defined as a set of search spaces at all configured ALs.

The search space may be classified into a common search space (CSS) and a UE-specific search space (USS). A predetermined group of UEs or all the UEs may monitor the common search space of the NR PDCCH in order to receive cell common control information, such as a paging message or dynamic scheduling for the system information block (SIB). For example, the UE may receive scheduling allocation information of NR PDSCH for SIB reception by monitoring the common search space of the NR PDCCH. In a case of the common search space, since a predetermined group of UEs or all the UEs need to receive the NR PDCCH, the common search space may be defined as a set of previously promised CCEs. The UE may receive scheduling allocation information about the UE-specific NR PDSCH or NR PUSCH by examining the UE-specific search space of the NR PDCCH. The UE-specific search space may be UE-specifically defined as a function of various system parameters and the UE identity (ID).

In the 5G system, the base station may configure, in the UE, configuration information for the search space of the NR PDCCH via higher layer signaling (e.g., SIB, MIB, and RRC signaling). For example, the base station may configure, in the UE, the number of NR PDCCH candidates at each aggregation level L, the monitoring periodicity for the search space, monitoring occasion of symbol units in a slot for the search space, the search space type (common search space or UE-specific search space), a combination of radio network temporary identifier (RNTI) and DCI format to be monitored in the search space, a CORESET index to monitor the search space, and the like. For example, parameters for the search space of the NR PDCCH may include the following pieces of information of Table 6 below.

TABLE 6

```
SearchSpace ::=                       SEQUENCE {
    searchSpaceId                     SearchSpaceId,
        (Search space Identity)
    controlResourceSetId              ControlResourceSetId   OPTIONAL, --
Cond SetupOnly
        (CORESET Identity)
    monitoringSlotPeriodicityAndOffset CHOICE {
        (Monitoring slot level periodicuty and offset)
        sl1                           NULL,
        sl2                           INTEGER (0..1),
        sl4                           INTEGER (0..3),
        sl5                           INTEGER (0..4),
        sl8                           INTEGER (0..7),
        sl10                          INTEGER (0..9),
        sl16                          INTEGER (0..15),
        sl20                          INTEGER (0..19),
        sl40                          INTEGER (0..39),
        sl80                          INTEGER (0..79),
        sl160                         INTEGER (0..159),
        sl320                         INTEGER (0..319),
        sl640                         INTEGER (0..639),
        sl1280                         INTEGER (0..1279),
        sl2560                         INTEGER (0..2559)
    }                                                        OPTIONAL, -- Cond Setup
    duration                          INTEGER (2..2559)      OPTIONAL, --
Need R
        (Monitoring duration)
    monitoringSymbolsWithinSlot                              BIT STRING (SIZE (14))
OPTIONAL, -- Cond Setup
        (Monitoring symbol location within slot)
    nrofCandidates                    SEQUENCE {
        (Number of PDCCH candicates for each aggregation level)
        aggregationLevel1             ENUMERATED {n0, n1, n2, n3, n4, n5, n6, n8},
        aggregationLevel2             ENUMERATED {n0, n1, n2, n3, n4, n5, n6, n8},
        aggregationLevel4             ENUMERATED {n0, n1, n2, n3, n4, n5, n6, n8},
        aggregationLevel8             ENUMERATED {n0, n1, n2, n3, n4, n5, n6, n8},
        aggregationLevel16            ENUMERATED {n0, n1, n2, n3, n4, n5, n6, n8}
    }                                                        OPTIONAL, -- Cond Setup
    searchSpaceType                   CHOICE {
        (Search space type)
        common                        SEQUENCE {
            (Common search space)
            dci-Format0-0-AndFormat1-0  SEQUENCE {
            ...
        }                                                    OPTIONAL, -- Need R
            dci-Format2-0             SEQUENCE {
                nrofCandidates-SFI    SEQUENCE {
                    aggregationLevel1                        ENUMERATED {n1, n2}
OPTIONAL, -- Need R
                    aggregationLevel2                        ENUMERATED {n1, n2}
OPTIONAL, -- Need R
                    aggregationLevel4                        ENUMERATED {n1, n2}
OPTIONAL, -- Need R
                    aggregationLevel8                        ENUMERATED {n1, n2}
OPTIONAL, -- Need R
                    aggregationLevel16                       ENUMERATED {n1, n2}
OPTIONAL -- Need R
                },
                ...
            }                                                OPTIONAL, -- Need R
            dci-Format2-1             SEQUENCE {
                ...
```

TABLE 6-continued

| | | |
|---|---|---|
| }<br>dci-Format2-2 | SEQUENCE { | OPTIONAL, -- Need R |
| ...<br>}<br>dci-Format2-3<br>    dummy1<br>sl16, sl20} OPTIONAL, -- Cond Setup<br>    dummy2<br>    ...<br>} | SEQUENCE {<br>    ENUMERATED {sl1, sl2, sl4, sl5, sl8, sl10,<br>    ENUMERATED {n1, n2}, | OPTIONAL, -- Need R<br><br><br><br>OPTIONAL -- Need R |
| },<br>ue-Specific<br>    (UE-specific search space)<br>    dci-Formats<br>formats0-1-And-1-1},<br>    ...,<br>}<br>}<br>} | SEQUENCE {<br>    ENUMERATED {formats0-0-And-1-0, | <br><br><br><br><br><br>OPTIONAL -- Cond Setup2 |

The base station may configure one or more search space sets for the UE according to configuration information. For example, the base station may configure search space set 1 and search space set 2 in the UE. With regard to search space set 1, the UE is configured to monitor DCI format A scrambled by X-RNTI in a common search space, and with regard to search space set 2, the UE is configured to monitor DCI format B scrambled by Y-RNTI in a UE-specific search space.

According to the configuration information, one or multiple search space sets may exist in the common search space or the UE-specific search space. For example, search space set #1 and search space set #2 may be configured as the common search space, and search space set #3 and search space set #4 may be configured as the UE-specific search space.

Meanwhile, in the common search space, the following combinations of the DCI format and the RNTI may be monitored. However, the disclosure is not limited thereto.
  DCI format 0_0/1_0 with CRC scrambled by C-RNTI, CS-RNTI, SP-CSI-RNTI, RA-RNTI, TC-RNTI, P-RNTI, SI-RNTI.
  DCI format 2_0 with CRC scrambled by SFI-RNTI.
  DCI format 2_1 with CRC scrambled by INT-RNTI.
  DCI format 2_2 with CRC scrambled by TPC-PUSCH-RNTI, TPC-PUCCH-RNTI.
  DCI format 2_3 with CRC scrambled by TPC-SRS-RNTI.

In the UE-specific search space, the following combinations of the DCI format and the RNTI may be monitored. However, the disclosure is not limited thereto.
  DCI format 0_0/1_0 with CRC scrambled by C-RNTI, CS-RNTI, TC-RNTI.
  DCI format 1_0/1_1 with CRC scrambled by C-RNTI, CS-RNTI, TC-RNTI.

The RNTIs may follow the definitions and usages described below.
  Cell RNTI (C-RNTI): For UE-specific PDSCH scheduling.
  Temporary Cell RNTI (TC-RNTI): For UE-specific PDSCH scheduling.
  Configured Scheduling RNTI (CS-RNTI): For semi-statically configured UE-specific PDSCH scheduling.
  Random access RNTI (RA-RNTI): For PDSCH scheduling in random access stage.
  Paging RNTI (P-RNTI): For scheduling of PDSCH through which paging is transmitted.

System information RNTI (SI-RNTI): For PDSCH scheduling in which system information is transmitted.
  Interruption RNTI (INT-RNTI): For notifying of whether to puncture PDSCH.
  Transmit power control for PUSCH RNTI (TPC-PUSCH-RNTI): For indication of power control command for PUSCH.
  Transmit power control for PUCCH RNTI (TPC-PUCCH-RNTI): For indication of power control command for PUCCH.
  Transmit power control for SRS RNTI (TPC-SRS-RNTI): For indication of power control command for SRS.

The above-described DCI formats may be defined as shown in Table 7 below.

TABLE 7

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

The base station generates a cyclic redundancy check (CRC) bit for error detection from the control information configuring the above-described DCI format, scrambles the generated CRC bit by the above-described RNTI, combines the DCI format and the CRC bit scrambled by the RNTI, and then performs channel coding processing thereon to configure an NR PDCCH to be transmitted to the UE.

In 5G, the search space of the aggregation level L in the CORESET p and the search space set s may be expressed by the following Equation.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \qquad \text{Equation 1}$$

L: Aggregation level.

$n_{CI}$: Carrier index.

$N_{CCE,p}$: Total number of CCEs existing in the control resource set p.

$n^\mu_{s,f}$: Slot index.

$M^{(L)}_{p,s,max}$: Number of PDCCH candidates of aggregation level L.

$m_{snCI}=0, \ldots, M^{(L)}_{p,s,max}-1$: PDCCH candidate group index of aggregation level L.

$i=0, \ldots, L-1$.

$Y_{p,n_{s,f}}^\mu = (A_p \cdot Y_{p,n_{s,f}^\mu - 1}) \mod D$, $Y_{p,-1} = n_{RNTI} \neq 0$, $A_0=39827$, $A_1=39829$, $A_2=39839$ $n_{RNTI}$: UE identifier.

In a case of the common search space, the $Y_{p,n_{s,f}}^\mu$ value may correspond to zero.

In a case of the UE-specific search space, the $Y_{p,n_{s,f}}^\mu$ value may correspond to a value that changes according to the UE ID (C-RNTI or ID configured by the base station for the UE) and a time index.

Next, a method in which, when CA is configured with regard to a DSS cell and a 5G cell and the 5G cell (SCell configuration) performs cross carrier scheduling of the DSS cell (PCell configuration), a search space of an NR PDCCH is configured and a UE receives the NR PDCCH in the search space will be described with reference to FIGS. 14 to 16.

Figure 14:
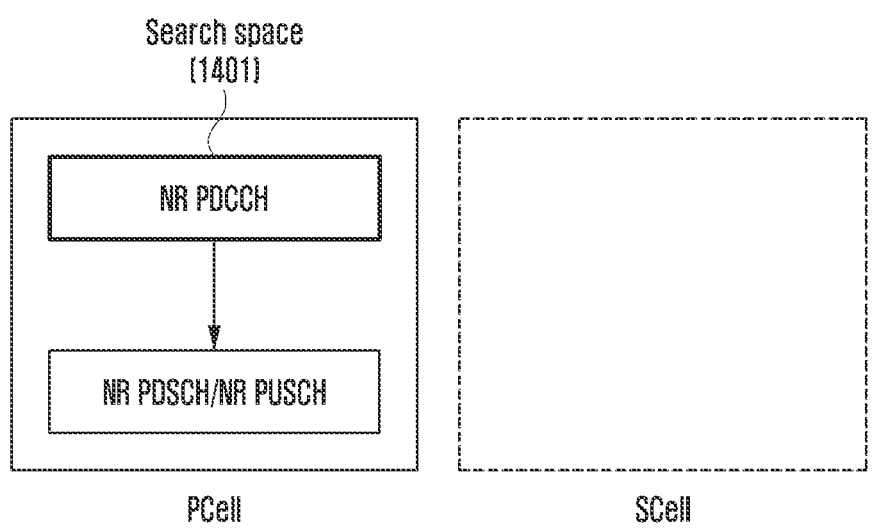
FIG. 14 illustrates a search space after an initial access of a UE in a wireless communication system according to an embodiment of the disclosure.
Figure 15:
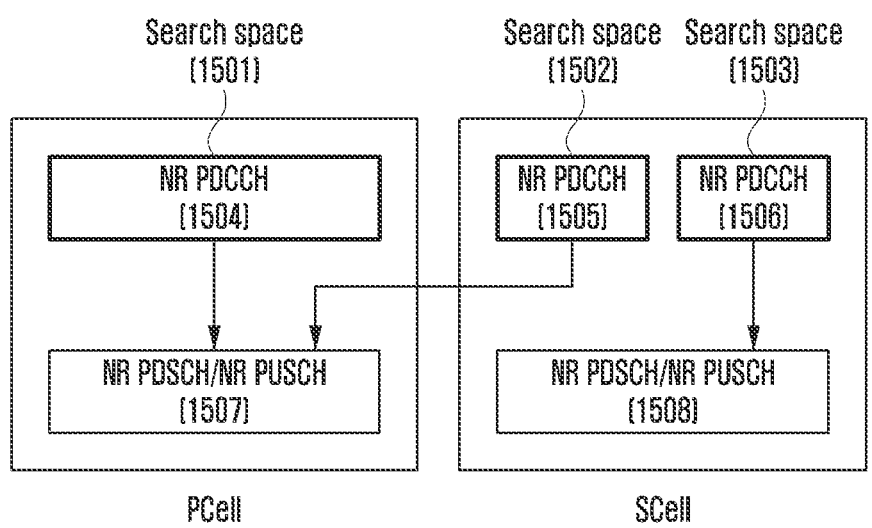
FIG. 15 illustrates an NR physical downlink control channel (NR PDCCH) search space in a wireless communication system according to an embodiment of the disclosure.
Figure 16:
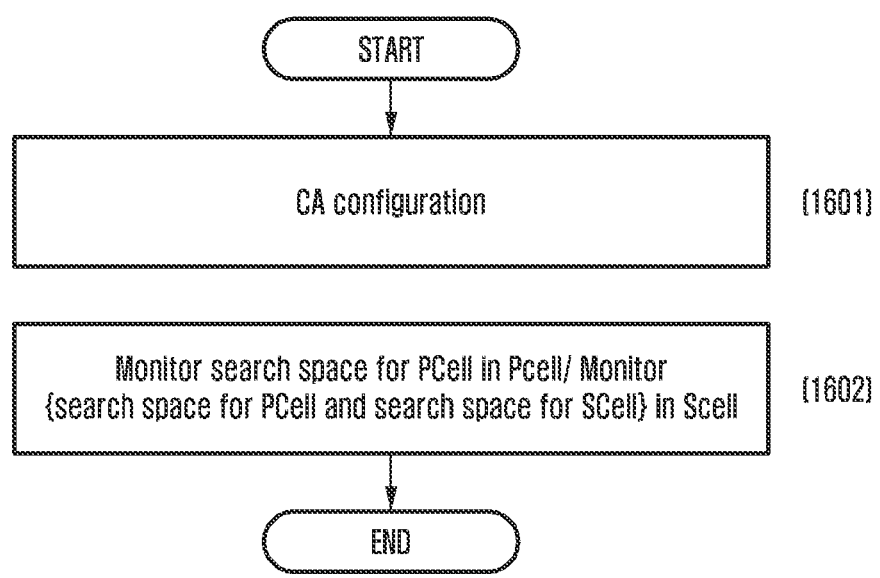
FIG. 16 illustrates a method in which a UE monitors an NR PDCCH search space in a wireless communication system according to an embodiment of the disclosure.

In the examples of FIGS. 14, 15 and 16, a relationship indicating whether a cell in which a search space of an NR PDCCH for scheduling a predetermined NR PDSCH/NR PUSCH is arranged is a PCell or an SCell may be indicated by an arrow. For example, the start point of the arrow indicates a cell in which the search space of the NR PDCCH is arranged, and the end point of the arrow indicates a cell in which the NR PDSCH/NR PUSCH scheduled by the NR PDCCH is transmitted. In the disclosure, it is assumed that the 5G UE performs connection to the DSS cell through initial access so as to recognize the DSS cell as the PCell, and then additionally configures the 5G cell as the SCell.

FIG. 14 illustrates a search space after an initial access of a UE in a wireless communication system according to an embodiment of the disclosure.

For example, FIG. 14 shows that a 5G UE performs connection to a DSS cell (PCell) through initial access and configures an NR PDCCH search space 1401 in the DSS cell. In addition, the NR PDCCH search space may be configured by a common search space and a UE-specific search space. FIG. 14 shows a state in which there is no search space for SCell because SCell has not yet been additionally configured in the initial access state.

FIG. 15 illustrates a method for configuring an NR PDCCH search space when an SCell is additionally configured for a UE, and when a PCell is cross-carrier scheduled from the SCell according to an embodiment of the disclosure.

As described above, since a common search space is used for scheduling system information or paging messages, it is preferable to arrange the common search space in the PCell and manage the same. Therefore, even if the SCell performs cross carrier scheduling of the PCell, the common search space (1501) of the PCell may be arranged in the PCell (i.e., the DSS cell). On the other hand, since the UE-specific search space (1502) of the PCell is moved to the SCell and arranged, the problem of insufficient radio resources for the NR PDCCH (1504) in the DSS cell (PCell) may be solved. Accordingly, there is no longer a UE-specific search space for a PCell in the PCell. In addition, a search space (1503) for scheduling the SCell is arranged in the SCell. NR PDCCH (1505) on the SCell schedules NR PDSCH (1507) and/or NR PUSCH (1507) on the PCell. NR PDCCH (1506) schedules NR PDSCH (1508) and/or NR PUSCH (1508).

As a modified example of the above embodiment, it is possible to move and arrange the search space of the PCell to the SCell and at the same time still maintain a part of the search space of the PCell in the PCell. For example, a common search space and UE-specific search space for scheduling the PCell are maintained in the PCell (indicated by reference numeral 1501), and a UE-specific search space 1502 for cross carrier scheduling the PCell and a search space for self-carrier scheduling the SCell are arranged in the SCell (indicated by reference numeral 1503). Accordingly, even if either one of the PCell and the SCell radio links is unstable, the base station may transmit the NR PDCCH for the PCell through the search space of the remaining stable radio link.

FIG. 16 illustrates a method in which a UE monitors an NR PDCCH search space in a wireless communication system according to an embodiment of the disclosure. That is, FIG. 16 shows a procedure in which the UE monitors the NR PDCCH according to the method of configuring the NR PDCCH search space described in FIG. 15. In operation 1601, the UE receives a CA configuration indicated from a base station. The CA configuration may include a configuration in which the SCell performs cross carrier scheduling of the PCell. When the UE completes the CA configuration according to the instruction of the base station, the UE may perform NR PDCCH monitoring in operation 1602. For example, according to the configuration of the NR PDCCH search space, the UE may monitor a search space for PCell in the PCell and monitor {search space for PCell, search space for SCell} in SCell. The configuration of the search space for the PCell and the CORESET configuration, which are monitored by the UE in the SCell, may follow the configuration of the search space for the SCell and the CORESET configuration, or may follow a separate independent configuration. In a subsequent operation, the UE may receive the NR PDSCH or transmit the NR PUSCH according to scheduling of the NR PDCCH having been successfully received.

Next, beam failure detection (BFD) and beam failure recovery (BFR) procedures will be described.

When the UE detects a reference signal transmitted by the base station in a predetermined cell, if the strength of the reference signal does not satisfy a predetermined condition, the UE determines that there is a problem in a beam represented by the reference signal of the cell, declares beam failure detection (BFD), and then enters a beam failure recovery (BFR) procedure. On the other hand, if the strength of the reference signal satisfies a predetermined condition, the UE determines that BFD has not occurred and continues the ongoing transmission/reception operation with the base station.

The reference signal may be an SS/PBCH block or CSI-RS transmitted by the base station in the corresponding cell. For example, when the signal strength of the SS/PBCH block received from the base station is lower than a threshold value previously promised with the base station during a T time period, the UE may determine that BFD on the cell has occurred. The base station may configure, for the UE, BFD-related information, such as the threshold value, the T time period, the reference signal used for determination of the BFD, and the relationship between a reference signal and a beam through signaling.

The UE, which has determined BFD for a predetermined beam in a cell, performs a BFR procedure for the corresponding beam. The UE performs the BFR through a random access procedure (hereinafter, BFR method 1) or performs the BFR by including signaling for notifying of beam failure in scheduling request information and transmitting the same to the base station (hereinafter, BFR method 2).

which is an uplink control channel Additionally, the scheduling request information may include control information, such as information related to a candidate beam to be newly connected or information of a reference signal connected to the candidate beam.

The BFR-related parameters for the BFR method 1 may include information as shown in Table 8 below.

TABLE 8

```
BeamFailureRecoveryConfig ::= SEQUENCE {
    rootSequenceIndex-BFR        INTEGER (0..137)              OPTIONAL, -- Need M
        (Random access preamble sequence for BFR)
    rach-ConfigBFR               RACH-ConfigGeneric            OPTIONAL, -- Need M
        (Random access configuration information for BFR)
    rsrp-ThresholdSSB            RSRP-Range                    OPTIONAL, -- Need M
        (SSB received signal strength threshold for beam failure determination)
    candidateBeamRSList          SEQUENCE  (SIZE(1..maxNrofCandidateBeams))
OF PRACH-ResourceDedicatedBFR   OPTIONAL, -- Need M
        (Information related to candidate beams for BFR)
    ssb-perRACH-Occasion         ENUMERATED {oneEighth, oneFourth, oneHalf, one,
two,                             four, eight, sixteen} OPTIONAL, -- Need M
        (SSB and RACH configuration information for BFR)
    ra-ssb-OccasionMaskIndex     INTEGER (0..15)
        OPTIONAL, -- Need M
        (SSB and RACH configuration information 2 for BFR)
    recoverySearchSpaceId        SearchSpaceId                 OPTIONAL, -- Need R
        (Search space Identity for BFR)
    ra-Prioritization            RA-Prioritization             OPTIONAL, -- Need R
        (Random access priority configuration information for BFR)
    beamFailureRecoveryTimer ENUMERATED {ms10, ms20, ms40, ms60, ms80,
ms100, ms150, ms200}             OPTIONAL, -- Need M
        (Timer for BFR)
    ...,
    [[
    msg1-SubcarrierSpacing                                     SubcarrierSpacing
OPTIONAL -- Need M
        (Subcarrier spacing of random access preamble for BFR)
    ]]
}
```

BFR method 1: The UE transmits a random access preamble for BFR through an uplink of a cell in which a beam failure has occurred. Thereafter, the UE receives a random access response corresponding to the random access preamble for BFR through a downlink of the cell in which the beam failure occurs. In addition, the UE completes the BFR procedure by transmitting message 3 corresponding to the random access response through the uplink of the cell in which the beam failure occurred, and receives message 4 corresponding thereto from the downlink of the cell in which the beam failure occurred. Through the BFR procedure, the UE may transmit control information, such as information relating to whether a beam failure has occurred, information related to a candidate beam to be newly connected, or information of a reference signal connected to the candidate beam, to the base station. For example, the message 3 may include the control information.

BFR method 2: The UE includes, in scheduling request information, signaling for notifying of the beam failure through the uplink of a cell in which a beam failure has occurred, and transmits the same to the base station. The scheduling request information is transmitted through a physical uplink control channel (PUCCH), Meanwhile, when the SCell is configured according to CA, and the SCell performs cross carrier scheduling of the PCell, information on the SCell may be additionally added, in addition to the information in Table 8 above. For example, in connection with the recoverySearchSpaceId field, the search space ID for the BFR of the SCell DL BWP may be required. Accordingly, when beam failure occurs in the PCell and beam failure recovery is performed, the downlink of the SCell may be monitored based on the search space ID for the BFR of the SCell DL BWP.

A method of configuring, in the UE, the search space ID for the BFR of the SCell DL BWP in connection with the BFR of the PCell may be as follows.

Method 1: When configuring the SCell, the base station may indicate the search space ID for BFR of the SCell DL BWP to the UE via signaling. When configuring the SCell, the base station may configure the information according to whether cross carrier scheduling is applied. The information may be configured when cross carrier scheduling is applied, and the information may not be configured if cross carrier scheduling is not applied.

Method 2: DL BWP and search space ID configured in a SCell may be used for BFR without signaling a separate search space ID related to BFR of a PCell.

SCell DL BWP: For example, the same BWP as the BWP ID of a PCell in which BFR has occurred, among DL BWPs configured in the SCell, may be used as the BWP for BFR. In addition, a specific BWP may be used as a BWP for BFR according to a preconfigured method. For example, a BWP having the lowest BWP ID may be used as the BWP for BFR.

SCell search space: Among the search space IDs configured in a SCell, the same search space ID as the search space ID configured for BFR in a PCell in which BFR has occurred may be used as the search space ID for BFR. In addition, a specific search space may be used as a search space for BFR according to a preconfigured method. For example, a search space having the lowest search space ID may be used as a search space for BFR.

Method 3: BFR resource configured in a SCell is used.
The information shown in Table 8 may also be configured in the SCell, and when the BFR procedure is triggered according to beam failure having occurred in the PCell, the search space ID for BFR configured for the activated BWP of the SCell may be used.

Configuration information for signal transmission and reception between the UE and the base station may be configured for each cell. In addition, the NR system may configure one or more bandwidth parts (BWPs) in one cell, and may adjust the configuration between the UE and the base station according to each BWP. The BWP refers to a subband allowed from at least 1 RB to a maximum system bandwidth in the frequency domain. The configuration information for reception of the NR PDCCH by the UE includes CORESET configuration information of Table 4 and search space configuration information of Table 6. The configuration information between the UE and the base station in the cell is configured by a hierarchical structure in the following order.

1) 'SearvingCellConfig': includes TDD UL-DL configuration information in units of cells, BWP configuration information, etc.

2) 'BWP': includes frequency domain size/position information of BWP, subcarrier spacing information applied to BWP, NR PDCCH configuration information, NR PDSCH configuration information, NR PUSCH configuration information, NR PUCCH configuration information, NR RACH configuration information, etc. The BWP may be divided into downlink BWP configuration information and uplink BWP configuration information.

3) 'PDCCH-Config': includes CORESET configuration information, search space configuration information, etc.

4) 'CORESET': includes CORESET ID, CORESET time/frequency configuration information, QCL indicator configuration information in DCI, etc.

5) 'SearchSpace': includes search space ID, CORESET ID, NR PDCCH monitoring periodicity/offset, aggregation level, search space type, etc.

The BFR-related parameters of Table 8 described above may be included in uplink BWP configuration information. Therefore, the UE performs uplink transmission, such as random access preamble transmission for BFR and message 3 transmission for BFR in the uplink BWP in which the BFR-related parameters are configured during the BFR procedure. In addition, downlink reception of a random access response for BFR, message 4, etc., which the UE should receive during the BFR procedure, is progressed through the downlink BWP connected to the uplink BWP. That is, the search space of the NR PDCCH received by the UE in order to perform the BFR procedure is used as the downlink BWP connected to the uplink BWP.

The BFR procedure of the UE my be classified into the following cases according to the relationship between an uplink BWP in which BFR-related parameters are configured (hereinafter referred to as 'uplink BWP for BFR' for convenience of explanation) and a downlink BWP connected to the uplink BWP for BFR (hereinafter referred to as 'downlink BWP for BFR' for convenience of explanation).

Case 1: When the uplink BWP for BFR and the downlink BWP for BFR are connected in a one-to-one relationship Case 2: When the uplink BWP for BFR and the downlink BWP for BFR are connected by 1:N (N is an integer greater than or equal to 2)

Hereinafter, the interconnection relationship between the uplink BWP for BFR and the downlink BWP for BFR will be described with reference to FIG. 17.

Figure 17:
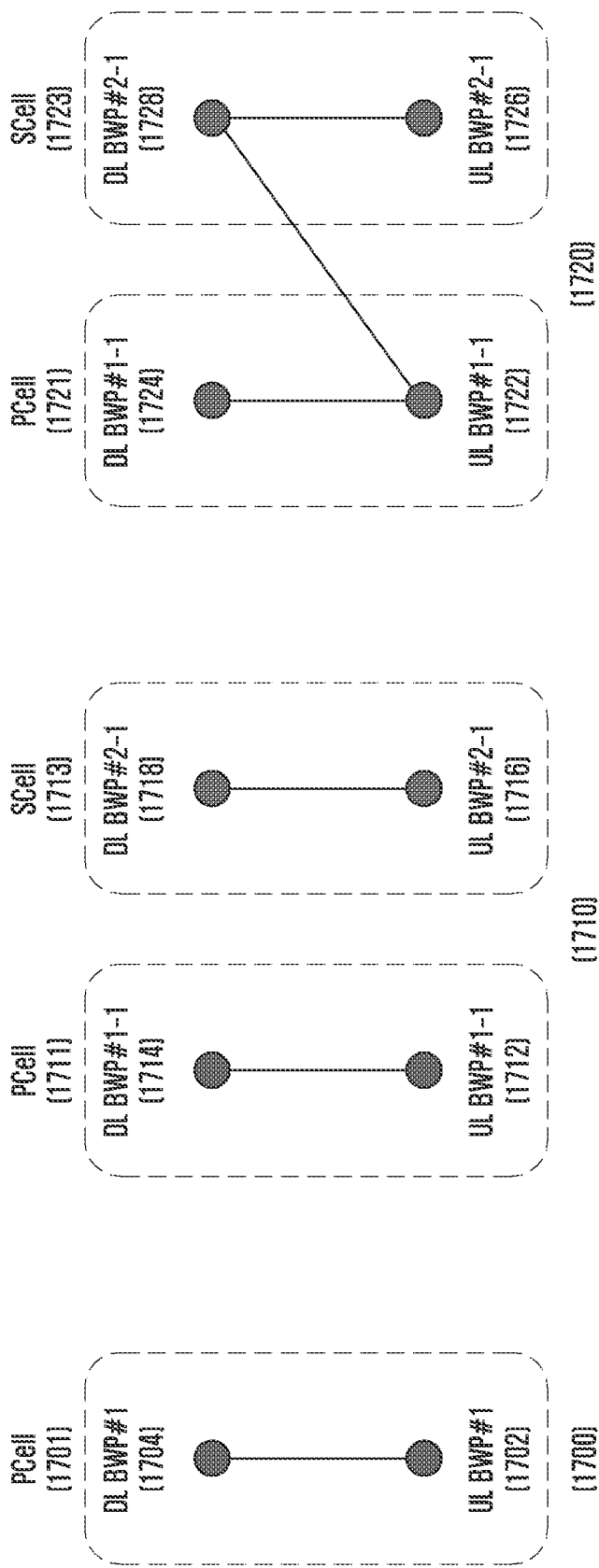
FIG. 17 illustrates an interconnection relationship between an uplink BWP for BFR and a downlink BWP for BFR in a wireless communication system according to an embodiment of the disclosure.

FIG. 17 illustrates an interconnection relationship between an uplink BWP for BFR and a downlink BWP for BFR in a wireless communication system according to an embodiment of the disclosure.

Reference number 1700 indicates a case in which one cell (PCell) 1701 is configured for a UE in a state in which CA is not applied to the UE. In addition, reference number 1700 indicates a case in which one downlink BWP 1704 and one uplink BWP 1702 connected thereto are configured for the UE. For the BFR procedure, a case in which the uplink BWP is configured as the uplink BWP for BFR and the downlink BWP is configured as the downlink BWP for BFR is shown. Reference number 1700 corresponds to the above 'case 1' in which the uplink BWP for BFR and the downlink BWP for BFR are connected one-to-one. As described above, a plurality of BWPs may be configured in a cell.

Reference numeral 1710 indicates a case in which a PCell 1711 and a SCell 1713 are configured for the UE in a state where CA is applied to the UE. In addition, reference numeral 1710 indicates a case in which one downlink BWP and one uplink BWP connected thereto are configured for the UE according to each cell. That is, one downlink BWP 1714 and one uplink BWP 1712 connected thereto are configured in the PCell, and one downlink BWP 1718 and one uplink BWP 1716 connected thereto are configured in the SCell. For the BFR procedure, it shows a case where the uplink BWP for BFR and the downlink BWP for BFR are independently configured in each of the PCell and the SCell. Reference numeral 1710 corresponds to the 'case 1' in which the uplink BWP for BFR and the downlink BWP for BFR are connected one-to-one for each cell. Similarly, a plurality of BWPs may be configured in each cell.

Reference number 1720 indicates a case in which a PCell 1721 and a SCell 1723 are configured for the UE in a state where CA is applied to the UE, and the SCell is configured to perform cross carrier scheduling of the PCell. As described with reference to FIG. 15, even if the SCell performs cross carrier scheduling of the PCell, at least a part of the search space of the PCell may still be allocated to the PCell as it is. For example, a common search space and UE-specific search space for scheduling the PCell are maintained in the PCell, and a UE-specific search space for cross carrier scheduling the PCell and a search space for self-carrier scheduling the SCell may be arranged in the SCell. Accordingly, reference number 1720 indicates that each of DL BWP of the PCell and DL BWP of the SCell is connected to the UL BWP 1722 of the PCell (indicated by reference numerals 1724 and 1728). In addition, a case, in which a uplink BWP 1726 is connected to one downlink BWP 1728 in the SCell, is configured. In a case of reference number 1720, for the BFR procedure, the uplink BWP for BFR and the downlink BWP for BFR are configured independently in each of the PCell and the SCell, but the uplink BWP for BFR of the PCell is additionally connected to the downlink BWP of the SCell. Therefore, reference number 1720 corresponds to the 'case 2' in which the uplink BWP for BFR of the PCell is connected to multiple downlink BWPs for BFR.

Hereinafter, a detailed method for a case, in which CA is configured in a first cell and a second cell, the second cell performs cross carrier scheduling of the first cell, and the uplink BWP for BFR and the downlink BWP for BFR are connected in 1:N relation, which are the main subject of the disclosure, will be described. The first cell may be a PCell, and the second cell may be an SCell. The second cell may be a 5G SCell. The first cell may be a cell to which DSS is applied (hereinafter, referred to as a DSS cell for convenience of explanation). Hereinafter, it is assumed that the first cell is a DSS cell, but this is only an example and the first cell is not limited to the DSS cell.

First Embodiment

In the first embodiment, a method in which, when CA is configured for a DSS cell and a 5G cell and the 5G cell performs cross carrier scheduling of the DSS cell, a UE performs beam failure recovery through the DSS cell when a beam failure occurs with regard to the DSS cell is described.

Hereinafter, the operation of the first embodiment will be described with reference to FIG. 18.

Figure 18:
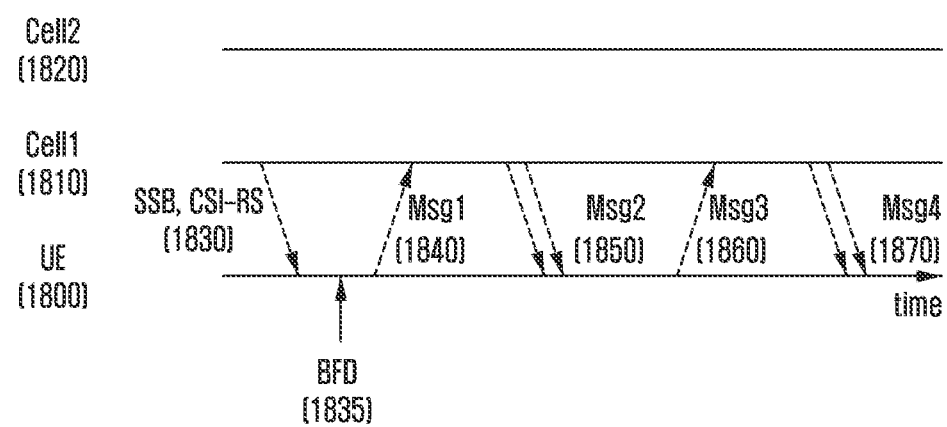
FIG. 18 illustrates a beam failure recovery procedure according to an embodiment of the disclosure.

FIG. 18 illustrates a beam failure recovery procedure according to an embodiment of the disclosure.

Referring to FIG. 18, it is assumed that CA configured by Cell1 1810 and Cell2 1820 is configured for a UE 1800, the Cell1 1810 is operated as a PCell and a DSS cell, and the Cell2 1820 is operated as an SCell. In operation 1830, the UE 1800 measures a reference signal of the Cell1 1810 transmitted by a base station and performs beam failure detection (BFD). As described above, the reference signal may be an SS/PBCH block or a CSI-RS.

For example, when the signal strength of the SS/PBCH block received from the base station is lower than a threshold value previously promised with the base station during a T time period, the UE 1800 may determine that BFD on the cell has occurred. The base station may configure, for the UE 1800, BFD-related information, such as the threshold value, the T time period, the reference signal used for determination of the BFD, and the relationship between a reference signal and a beam through signaling.

When the UE 1800 detects a reference signal transmitted by the base station in the cell1 1810, if the strength of the reference signal does not satisfy a predetermined condition, the UE 1800 determines that there is a problem in a beam represented by the reference signal of the cell, declares beam failure detection (BFD) (indicated by reference numeral 1835), and then enters a beam failure recovery (BFR) procedure.

The main gist of the first embodiment is that when the UE 1800 detects a beam failure in a predetermined cell, the UE 1800 performs a beam failure recovery procedure in the cell. When the 'BFR method 1' described above is applied, the UE 1800, which has declared the BFD on the cell1 1810 (indicated by reference numeral 1835), transmits a random access preamble for BFR through the uplink of the cell1 1810 in which the beam failure has occurred (indicated by reference numeral 1840). Thereafter, the UE 1800 receives a random access response (or message 2) corresponding to the random access preamble for BFR through the downlink of Cell1 1810 in which the beam failure occurs (indicated by reference numeral 1850). The random access response is transmitted to the UE 1800 through a PDSCH, and is accompanied by a PDCCH for scheduling the PDSCH. In addition, the UE 1800 transmits message 3 corresponding to the random access response through the uplink of cell1 1810 in which the beam failure occurs (indicated by reference numeral 1860), and again receives message 4 corresponding thereto from the downlink of the cell1 1810 in which the beam failure occurs, to thereby complete the BFR procedure (indicated by reference numeral 1870). The message 3 is transmitted to the base station through a PUSCH, and the message 4 is transmitted to UE 1800 through the PDSCH and is accompanied by a PDCCH for scheduling the PDSCH. Although the 'BFR method 1' in FIG. 18 has been described based on 4-step random access in which a transmission/reception procedure between the UE 1800 and the base station is configured by four stages, the BFR method 1 may be applied with a two-step random access scheme configured by two stages of a procedure in which the UE 1800 transmits a random access preamble to the base station and the UE 1800 receives a response signal corresponding thereto from the base station.

When the above-described 'BFR method 2' is applied to the first embodiment, the UE includes, in scheduling request information, signaling for notifying of the beam failure through the uplink of cell1 1810 in which the beam failure has occurred, and transmits the same to the base station. The scheduling request information is transmitted through a PUCCH which is an uplink control channel Additionally, the scheduling request information may include control information, such as information related to a candidate beam to be newly connected or information of a reference signal connected to the candidate beam.

Second Embodiment

In the second embodiment, a method in which, when CA is configured for a DSS cell and a 5G cell and the 5G cell performs cross carrier scheduling of the DSS cell, a UE performs beam failure recovery through the DSS cell and 5G cell when a beam failure occurs with regard to the DSS cell is described.

In the second embodiment, when a UE detects a beam failure for a predetermined cell, the UE performs a beam recovery procedure by transmitting a random access preamble for BFR through the uplink of the corresponding cell and receiving the downlink signal for BFR from another cell connected to the cell in which the beam failure has occurred. According to the second embodiment, it may be expected that the UE avoids an additional beam failure by defining a downlink signal reception operation for BFR from a cell different from the cell in which the beam failure has already occurred during the BFR procedure.

Hereinafter, the operation of the second embodiment will be described with reference to FIG. 19.

Figure 19:
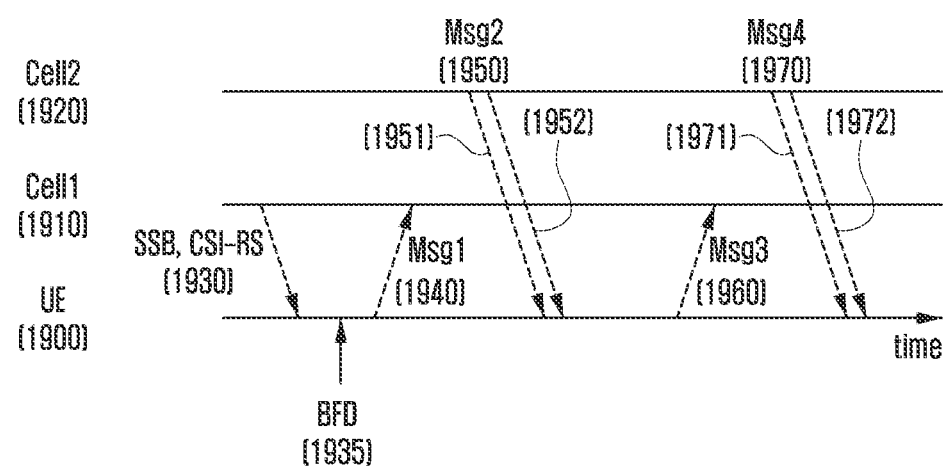
FIG. 19 illustrates a beam failure recovery procedure according to an embodiment of the disclosure.

FIG. 19 illustrates a beam failure recovery procedure according to an embodiment of the disclosure.

Referring to FIG. 19, it is assumed that CA configured by Cell1 1910 and Cell2 1920 is configured for a UE 1900, Cell1 1910 is operated as a PCell and a DSS cell, and Cell2 1920 is operated as an SCell. In operation 1930, the UE 1900 measures a reference signal of Cell1 1910 transmitted by a base station and performs beam failure detection (BFD). As described above, the reference signal may be an SS/PBCH block or a CSI-RS.

For example, when the signal strength of the SS/PBCH block received from the base station is lower than a threshold value previously promised with the base station during a T time period, the UE 1900 may determine that BFD on the cell has occurred. The base station may configure, for the UE, BFD-related information, such as the threshold value, the T time period, the reference signal used for determination of the BFD, and the relationship between a reference signal and a beam through signaling.

When the UE 1900 detects a reference signal transmitted by the base station in the cell1 1910, if the strength of the reference signal does not satisfy a predetermined condition, the UE 1900 determines that there is a problem in a beam represented by the reference signal of the cell, declares beam failure detection (BFD) (indicated by reference numeral 1935), and then enters a beam failure recovery (BFR) procedure.

When the 'BFR method 1' described above is applied, the UE 1900, which has declared the BFD on the cell1 1910 in operation 1935, transmits a random access preamble for BFR through the uplink of the cell1 in which the beam failure has occurred (indicated by reference numeral 1940). Thereafter, the UE 1900 receives a random access response (or message 2) corresponding to the random access preamble for BFR through the downlink of cell2 1920 (indicated by reference numeral 1950). For the BFR procedure, the cell2 1920 and the cell1 1910 are mutually connected with each other. The random access response is transmitted to the UE through a PDSCH (indicated by reference numeral 1952), and is accompanied by a PDCCH for scheduling the PDSCH (indicated by reference numeral 1951). In addition, the UE 1900 transmits message 3 corresponding to the random access response through the uplink of cell1 1910 in which the beam failure occurs (indicated by reference numeral 1960), and again receives message 4 corresponding thereto from the downlink of the cell2 1920, to thereby complete the BFR procedure (indicated by reference numeral 1970). The message 3 is transmitted to the base station through a PUSCH, and the message 4 is transmitted to UE 1900 through the PDSCH (indicated by reference numeral 1972) and is accompanied by a PDCCH for scheduling the PDSCH (indicated by reference numeral 1971).

Through the example of FIG. 19, the search space for BFR is located in cell2 1920, and message 2 and message 4, which are downlink signals received by the UE 1900 from the base station, are commonly self-carrier scheduled in cell2 1920, respectively. The message 1 and message 3, which are uplink signals transmitted from the UE 1900 to the base station, are commonly transmitted through the uplink of cell1 1910.

Although the 'BFR method 1' in FIG. 19 has been described based on 4-step random access in which a transmission/reception procedure between the UE 1900 and the base station is configured by four stages, the BFR method 1 may be applied with a two-step random access scheme configured by two stages of a procedure in which the UE 1900 transmits a random access preamble to the base station and the UE 1900 receives a response signal corresponding thereto from the base station.

When the above-described 'BFR method 2' is applied to the second embodiment, the UE 1900 includes, in scheduling request information, signaling for notifying of the beam failure through the uplink of cell1 1910 in which the beam failure has occurred, and transmits the same to the base station. The scheduling request information is transmitted through a PUCCH which is an uplink control channel Additionally, the scheduling request information may include control information, such as information related to a candidate beam to be newly connected or information of a reference signal connected to the candidate beam.

Various modifications are possible in the second embodiment. For example, as shown in FIG. 20, it is possible to define whether a downlink signal received by a UE 2000 during the BFR procedure is to be received in cell1 2010 or is to be received in cell2 2020 according to a channel.

Figure 20:
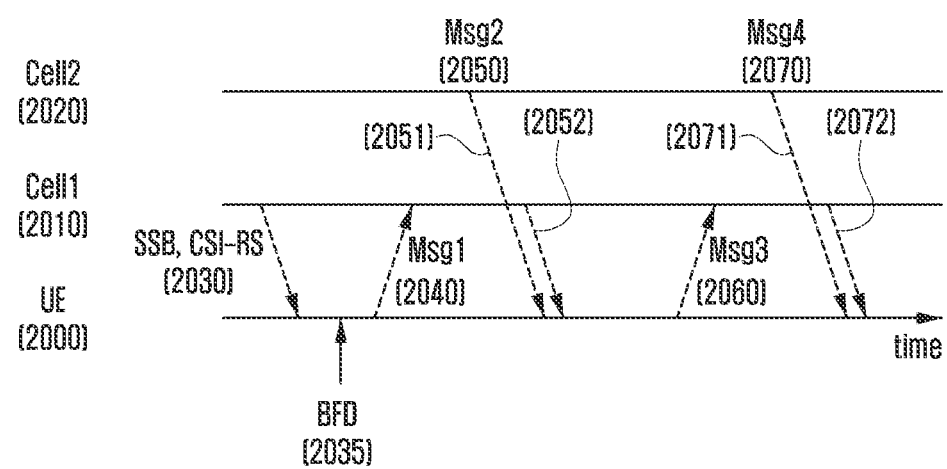
FIG. 20 illustrates a beam failure recovery procedure according to an embodiment of the disclosure.

FIG. 20 illustrates a beam failure recovery procedure according to an embodiment of the disclosure.

It is assumed that CA configured by Cell1 2010 and Cell2 2020 is configured for a UE 2000, Cell1 2010 is operated as a PCell and a DSS cell, and Cell2 2020 is operated as an SCell. In operation 2030, the UE 2000 measures a reference signal of Cell1 2010 transmitted by a base station and performs BFD 2035. As described above, the reference signal may be an SS/PBCH block or a CSI-RS.

Referring to FIG. 20, The UE 2020 transmits Msg 1 (a random access preamble for BFR) through the uplink of the cell1 in which the beam failure has occurred. A base station transmits, in cell2 2020, a PDCCH 2051 for scheduling a PDSCH 2052 for carrying message 2 2050. In addition, the base station transmits a PDSCH 2052, which is cross carrier scheduled by the PDCCH 2051, in cell1 2010. In response to the MSG 2 2050, the UE 2000 transmits MSG 3 2060 to the base station. In a similar method, the base station transmits the PDCCH 2071, which performs scheduling of a PDSCH 2072 for carrying message 4 2070, in cell2 2020, and transmits a PDSCH 2072, which is cross carrier scheduled by the PDCCH 2071, in cell1 2010. Therefore, at least the PDCCHs 2051 and 2071 are allowed to be received by the UE 2000 in the cell2 2020 by avoiding the cell1 2010 in which the beam failure has occurred, and thus the possibility of additional beam failure may be lowered.

Figure 21:
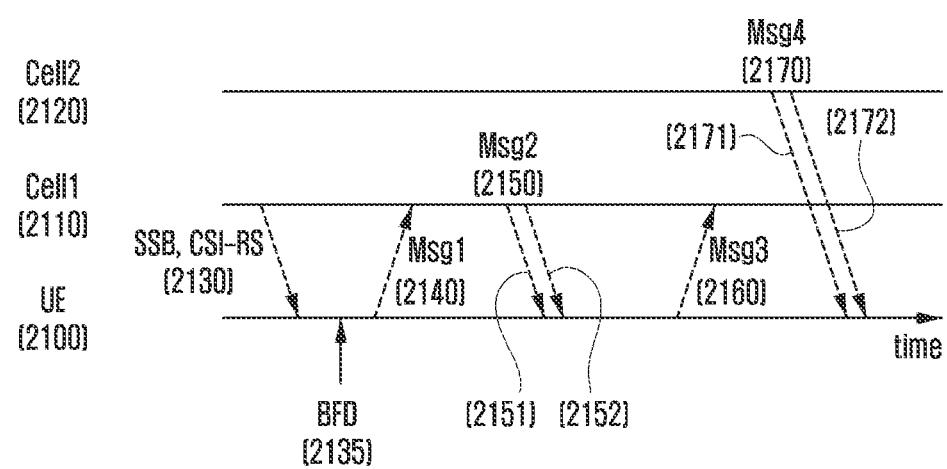
FIG. 21 illustrates a beam failure recovery procedure according to an embodiment of the disclosure.

As another modified example of the second embodiment, as shown in FIG. 21, it is possible to define whether the downlink signal received by the UE 2100 is to be received in cell1 2110, or is to be received in cell2 2120 according to the random access stage for BFR.

FIG. 21 illustrates a beam failure recovery procedure according to an embodiment of the disclosure.

It is assumed that CA configured by Cell1 2110 and Cell2 2120 is configured for a UE 2100, Cell1 2110 is operated as a PCell and a DSS cell, and Cell2 2120 is operated as an SCell. In operation 2130, the UE 2100 measures a reference signal of Cell1 2110 transmitted by a base station and performs BFD 2135. As described above, the reference signal may be an SS/PBCH block or a CSI-RS.

Referring to FIG. 21, message 1 2140, message 2 2150 (a PDCCH 2151 for scheduling a PDSCH 2152 for carrying the message 2 2150), and message 3 2160 may be transmitted/received between the UE and the base station through the uplink of cell1 2110 or the downlink of cell1 2110. In addition, the UE 2100 may be allowed to receive message 4 2170 (a PDCCH 2171 for scheduling a PDSCH 2172 for carrying the message 4 2170) from the cell2 2120.

Third Embodiment

In the third embodiment, a method in which, when CA is configured for a DSS cell and a 5G cell and the 5G cell performs cross carrier scheduling of the DSS cell, a UE performs beam failure recovery through the 5G cell when a beam failure occurs with regard to the DSS cell is described.

In the third embodiment, when a UE detects a beam failure for a predetermined cell, the UE performs a beam recovery procedure by transmitting a random access preamble for BFR through the uplink of another cell connected to the cell in which the beam failure has occurred and receiving the downlink signal for BFR from the other cell.

According to the third embodiment, it may be expected that the UE avoids an additional beam failure by defining an uplink signal transmission operation for BPR to a cell different from the cell in which the beam failure has already occurred during the BFR procedure and a downlink signal reception operation for BFR therefrom.

Hereinafter, the operation of the third embodiment will be described with reference to FIG. 22.

Figure 22:
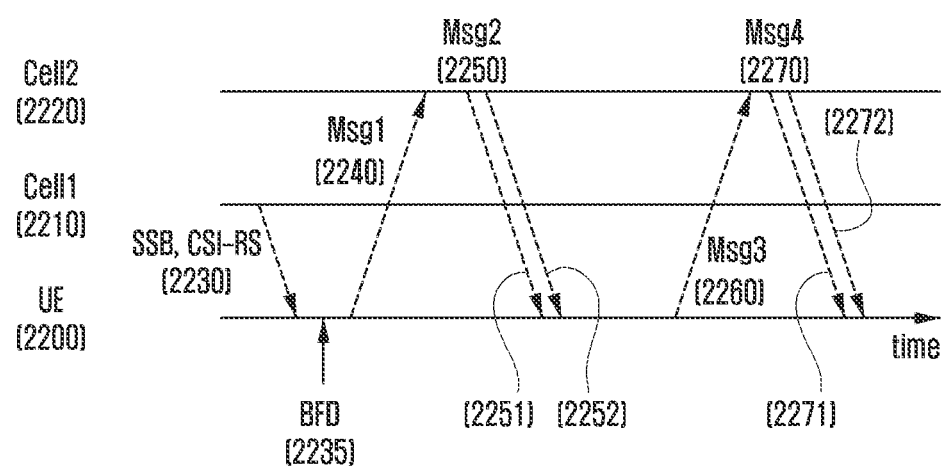
FIG. 22 illustrates a beam failure recovery procedure according to an embodiment of the disclosure.

FIG. 22 illustrates a beam failure recovery procedure according to an embodiment of the disclosure.

Referring to FIG. 22, it is assumed that CA configured by Cell1 2210 and Cell2 2220 is configured for a UE 2200, the Cell1 2210 is operated as a PCell and a DSS cell, and the Cell2 2220 is operated as an SCell. In operation 2230, the UE 2200 measures a reference signal of the Cell1 2210 transmitted by a base station and performs beam failure detection (BFD) 2235. As described above, the reference signal may be an SS/PBCH block or a CSI-RS.

For example, when the signal strength of the SS/PBCH block received from the base station is lower than a threshold value previously promised with the base station during a T time period, the UE 2200 may determine that BFD on the cell has occurred. The base station may configure, for the UE, BFD-related information, such as the threshold value, the T time period, the reference signal used for determination of the BFD, and the relationship between a reference signal and a beam through signaling.

When the UE 2200 detects a reference signal transmitted by the base station in the cell1 2210, if the strength of the reference signal does not satisfy a predetermined condition, the UE 2200 determines that there is a problem in a beam represented by the reference signal of the cell, declares beam failure detection (BFD) (indicated by reference numeral 2235), and then enters a beam failure recovery (BFR) procedure.

When the 'BFR method 1' described above is applied, the UE 2200, which has declared the BFD on the cell1 2210 in operation 2235, transmits a random access preamble for BFR through the uplink of the cell2 2220 (indicated by reference numeral 2240). For the BFR procedure, the cell2 2220 and the cell1 2210 are mutually connected with each other. Thereafter, the UE 2200 receives a random access response (or message 2) corresponding to the random access preamble for BFR through the downlink of cell2 2220 (indicated by reference numeral 2250). The random access response is transmitted to the UE through a PDSCH (indicated by reference numeral 2252), and is accompanied by a PDCCH for scheduling the PDSCH (indicated by reference numeral 2251). In addition, the UE 2200 transmits message 3 corresponding to the random access response through the uplink of cell1 2210 (indicated by reference numeral 2260), and again receives message 4 corresponding thereto from the downlink of the cell2 2220, to thereby complete the BFR procedure (indicated by reference numeral 2270). The message 3 is transmitted to the base station through a PUSCH, and the message 4 is transmitted to UE through the PDSCH (indicated by reference numeral 2272) and is accompanied by a PDCCH for scheduling the PDSCH (indicated by reference numeral 2271).

Through the example of FIG. 22, the search space for BFR is located in cell2 2220, and message 2 and message 4, which are downlink signals received by the UE 2200 from the base station, are commonly self-carrier scheduled in cell2 2220, respectively. The message 1 and message 3, which are uplink signals transmitted from the UE 2200 to the base station, are commonly transmitted through the uplink of cell2 2220.

Although the 'BFR method 1' in FIG. 22 has been described based on 4-step random access in which a transmission/reception procedure between the UE 2200 and the base station is configured by four stages, the BFR method 1 may be applied with a two-step random access scheme configured by two stages of a procedure in which the UE 2200 transmits a random access preamble to the base station and the UE 2200 receives a response signal corresponding thereto from the base station.

When the above-described 'BFR method 2' is applied to the third embodiment, the UE 2200 includes, in scheduling request information, signaling for notifying of the beam failure through the uplink of cell2 2220, which is connected to the cell1 2210 in which the beam failure has occurred, and transmits the same to the base station. The scheduling request information is transmitted through a PUCCH which is an uplink control channel. Additionally, the scheduling request information may include control information, such as information related to a candidate beam to be newly connected or information of a reference signal connected to the candidate beam.

Various modifications are possible in the third embodiment. For example, as shown in FIG. 23, it is possible to define whether a downlink signal received by a UE 2300 during the BFR procedure is to be received in cell1 2310 or is to be received in cell2 2320 according to a channel.

Figure 23:
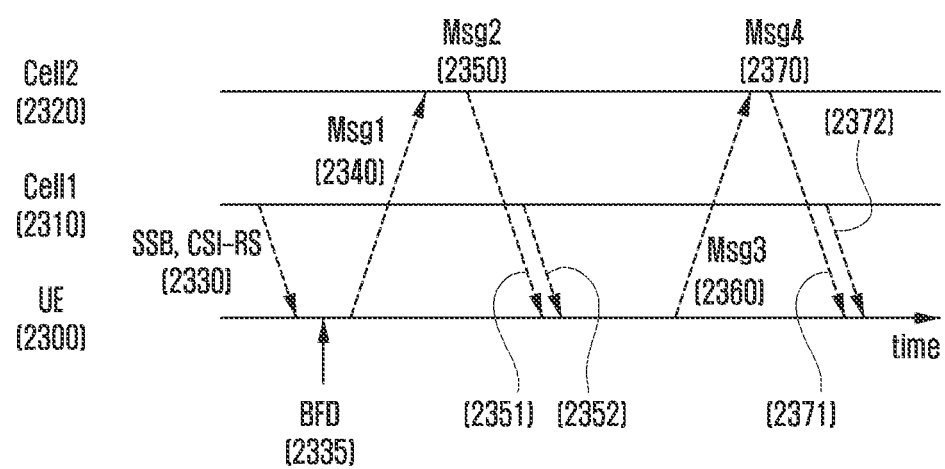
FIG. 23 illustrates a beam failure recovery procedure according to an embodiment of the disclosure.

FIG. 23 illustrates a beam failure recovery procedure according to an embodiment of the disclosure.

It is assumed that CA configured by Cell1 2310 and Cell2 2320 is configured for a UE 2300, the Cell1 2310 is operated as a PCell and a DSS cell, and the Cell2 2320 is operated as an SCell. In operation 2330, the UE 2300 measures a reference signal of the Cell1 2310 transmitted by a base station and performs beam failure detection (BFD) 2335. As described above, the reference signal may be an SS/PBCH block or a CSI-RS.

Referring to FIG. 23, The UE 2320 transmits Msg 1 (a random access preamble for BFR) through the uplink of the cell1 2310 in which the beam failure has occurred. A base station transmits, in cell2 2320, a PDCCH 2351 for scheduling a PDSCH 2352 for carrying message 2 2350. In addition, the base station transmits a PDSCH 2352, which is cross carrier scheduled by the PDCCH 2351, in cell1 2310. In response to the MSG 2 2350, the UE 2300 transmits MSG 3 2360 to the base station. In a similar method, the base station transmits the PDCCH 2371, which performs scheduling of a PDSCH 2372 for carrying message 4 2370, in cell2 2320, and transmits a PDSCH 2372, which is cross carrier scheduled by the PDCCH 2371, in cell1 2310. Therefore, at least the PDCCHs 2351 and 2371 are allowed to be received in the cell2 2320 by avoiding the cell1 2310 in which the beam failure has occurred, and thus the possibility of additional beam failure may be lowered.

Figure 24:
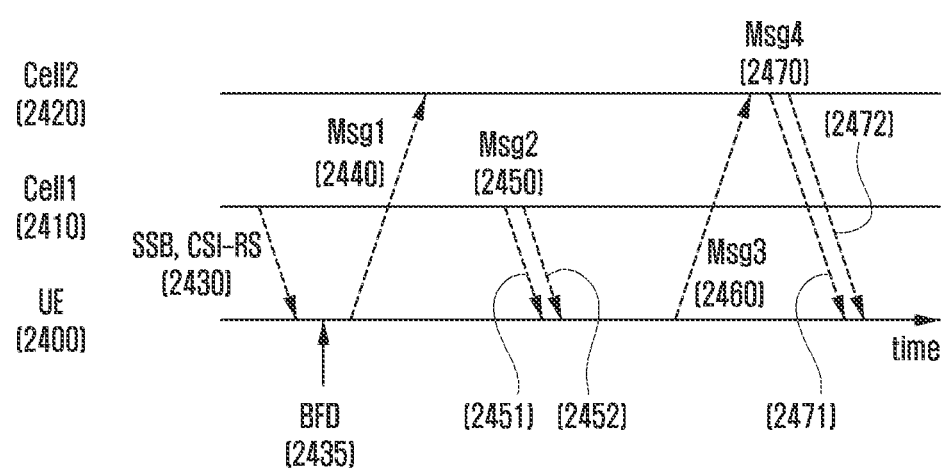
FIG. 24 illustrates a beam failure recovery procedure according to an embodiment of the disclosure.

As another modified example of the third embodiment, as shown in FIG. 24, it is possible to define whether the downlink signal received by the UE 2400 is to be received in cell1 2410, or is to be received in cell2 2420 according to the random access stage for BFR.

FIG. 24 illustrates a beam failure recovery procedure according to an embodiment of the disclosure.

It is assumed that CA configured by Cell1 2410 and Cell2 2420 is configured for a UE 2400, Cell1 2410 is operated as a PCell and a DSS cell, and Cell2 2420 is operated as an SCell. In operation 2430, the UE 2400 measures a reference signal of Cell1 2410 transmitted by a base station and performs BFD 2435. As described above, the reference signal may be an SS/PBCH block or a CSI-RS.

Referring to FIG. 24, message 1 2440, message 3 2460, message 4 2470 (a PDCCH 2471 for scheduling a PDSCH 2472 for carrying the message 4 2470) may be transmitted/received between the UE 2400 and the base station through the uplink of cell2 2420 or the downlink of cell2 2420. In addition, the UE may be allowed to receive message 2 2450 (a PDCCH 2451 for scheduling a PDSCH 2452 for carrying the message 2 2450) from the cell1 2410.

Combining the first, second, and third embodiments described above, a base station may notify a UE of a method to be applied by the UE to proceed with the BFR procedure through signaling. In addition, as an additional modification, information indicating a cell, to which a signal transmitted by a UE or a base station during the BFR procedure is to be transmitted, may be notified to the base station or the UE, respectively. The information may include a cell index.

The base station may determine whether the methods according to the first, second, and third embodiments described above are to be applied only to random access during the BFR procedure or to general random access as well, and may transmit the determination to the UE.

Hereinafter, an operation of configuring CA to the UE will be described with reference to FIG. 25.

Figure 25:
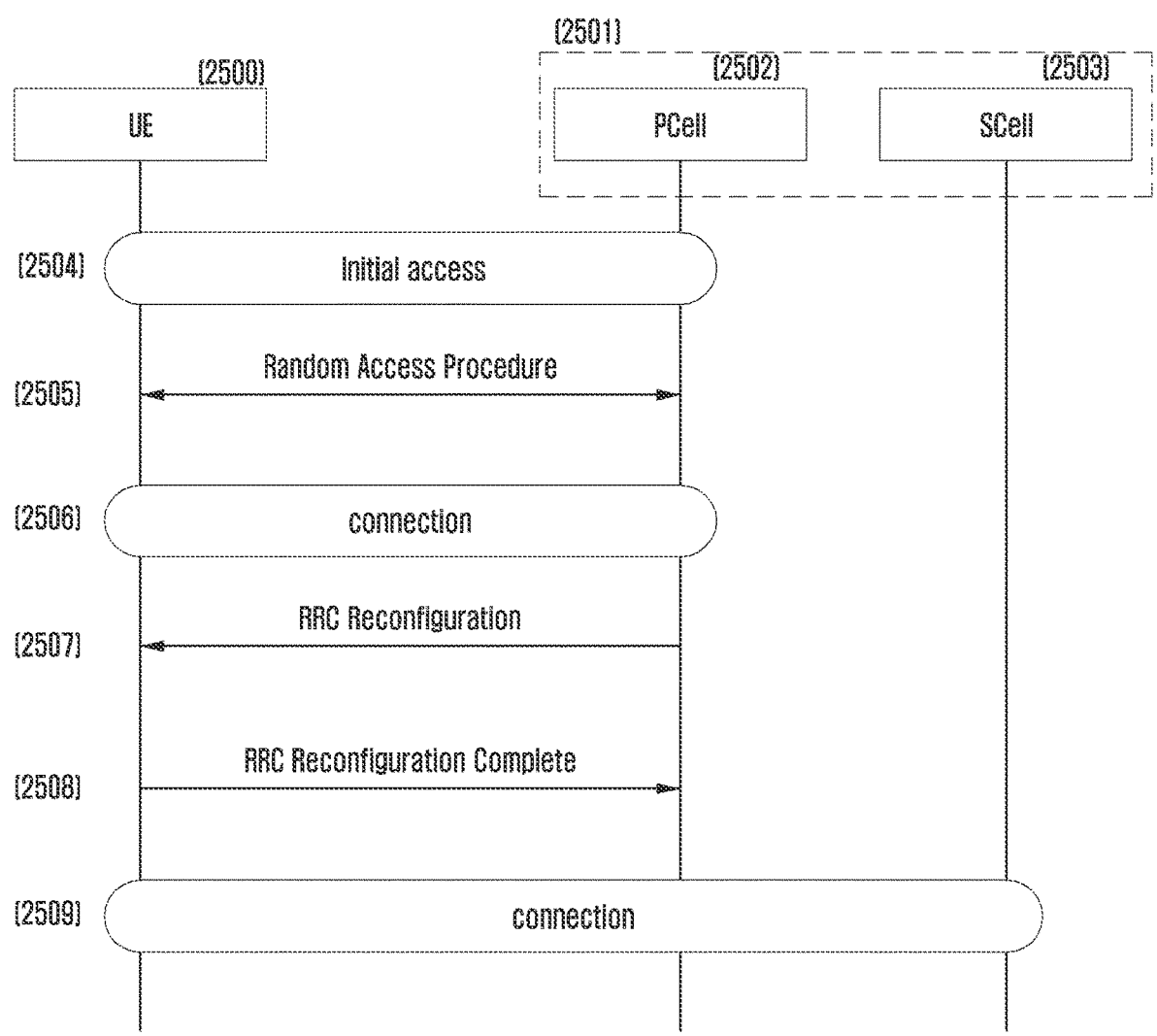
FIG. 25 illustrates a procedure of configuring CA in a wireless communication system according to an embodiment of the disclosure.

FIG. 25 illustrates a procedure for configuring CA in a wireless communication system according to an embodiment of the disclosure.

Referring to FIG. 25, in operation 2504, a UE 2500 performs initial access to a base station 2501. In an initial access process, the UE 2500 may establish downlink time and frequency synchronization from a synchronization signal transmitted by a base station 2501 through cell search and obtain a cell ID. In addition, the UE 2500 may receive a physical broadcast channel (PBCH) by using the obtained cell ID, and may acquire a master information block (MIB), which is essential system information, from the PBCH. Additionally, the UE 2500 may receive a system information block (SIB) transmitted by the base station to obtain transmission/reception related control information common to cells. The cell common transmission/reception related control information may include random access related control information, paging related control information, common control information relating to various physical channels, and the like. In operation 2504, a cell accessed by the UE 2500 may denote a PCell 2502.

In operation 2505, the UE 2500 performs random access to the base station 2501 by using the random access related control information obtained from the system information block. The UE 2500, which has successfully completed the random access procedure, may establish uplink time synchronization with the base station 2501. In addition, the UE is switched to a connected state so as to facilitate one-to-one communication between the base station 2501 and the UE 2500.

In operation 2506, the UE 2500 performs data transmission/reception to/from the base station 2501 through the PCell 2502. The UE 2500 reports UE capability information to the base station 2501, and may notify the base station 2501 of whether the UE 2500 itself supports a predetermined function, the maximum allowable value of a function supported by the UE 2500, and the like. The UE capability information may include whether the UE 2500 supports CA, and CA-related information. In addition, the UE capability information may include whether the UE supports an operation in which SCell performs cross carrier scheduling of the PCell 2502, an NR PDCCH search method supported by the UE 2500, a BFR method, and the like. In operation 2506, the UE 2500 may perform a measurement report relating to neighboring cells. For example, if the strength of a received signal from neighboring cells observed by the UE 2500 is greater than a predetermined threshold, the ID and received signal strength of the corresponding cell are included in the measurement report and transmitted to the base station 2501. The reference signal observed by the UE 2500 for measurement report may be an SS/PBCH block or CSI-RS transmitted by a neighboring cell. The base station 2501 may notify the UE 2500 of control information for the measurement report of the UE 2500 through signaling. The control information for the measurement report of the UE 2500 may include at least a part of control information associated with the following.

Information about a reference signal of a neighboring cell to be measured. For example, whether the reference signal is an SS/PBCH block or CSI-RS.

Subcarrier spacing of the reference signal.

time/frequency domain location of the reference signal.

Start/frequency domain size of the reference signal.

When reporting the measurement result measured by the UE to the base station, whether to report periodically or to report based on a predetermined event.

The base station 2501 may determine whether to configure CA for the UE 2500 or to instruct a handover to another cell by referring to the measurement report of the UE 2500. The determination of whether to configure the CA may refer to, for example, determining whether to combine an additional carrier (SCell) 2503 with the PCell 2502 of a current UE. If the base station 2501 determines to configure CA for the UE 2500, the base station 2501 may include, in 'RRC reconfiguration (RRC)' message, related information required for coupling the SCell 2503 to the UE 2500 and transmit the same to the UE 2500 in operation 2507. The related information required for the CA may include carrier bandwidth and center frequency information of the SCell 2503, common control information relating to a physical channel of the SCell 2503, and the like.

The UE 2500 completes the process for performing communication with the SCell 2503 according to the received 'RRC reconfiguration' message, and then, in operation 2508, the UE transmits 'RRC reconfiguration complete' message to the base station. Now, from operation 2509, the UE 2500 is in a state of completing preparation to perform data transmission/reception to/from both the PCell 2502 and the SCell 2503 of the base station.

Thereafter, when a beam failure occurs, the UE may perform the BFR procedure according to the first, second, and third embodiments described above. Meanwhile, the base station may notify the UE of a method to be applied by the UE to proceed with the BFR procured through signaling.

Figure 26:
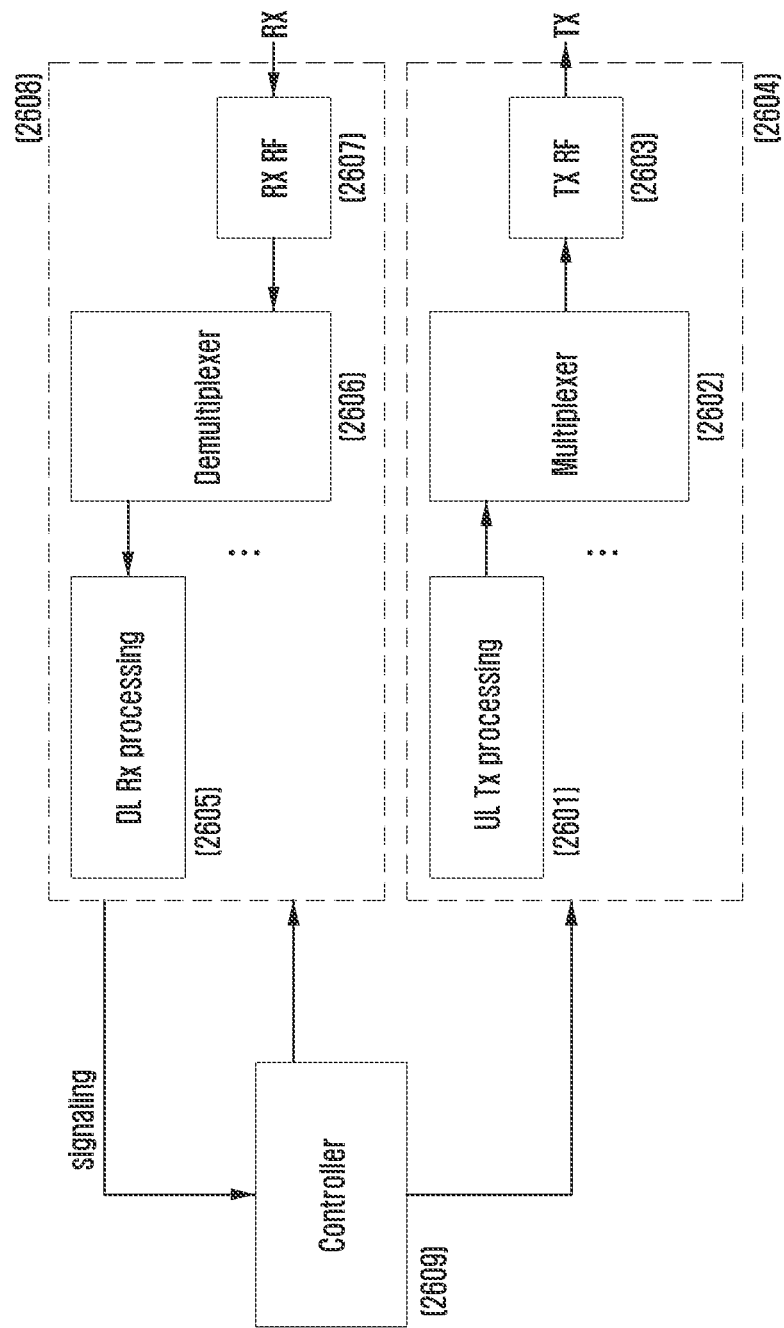
FIG. 26 illustrates a UE transceiver in a wireless communication system according to an embodiment of the disclosure.

FIG. 26 illustrates a UE transceiver in a wireless communication system according to an embodiment of the disclosure. For convenience of explanation, illustration and description of devices not directly related to the disclosure may be omitted.

Referring to FIG. 26, a UE may include: a transmitter 2604 including an uplink transmission processing block 2601, a multiplexer 2602, and a transmission RF block 2603; a receiver 2608 including a downlink reception processing block 2605, a demultiplexer 2606, and a receiving RF block 2607; and a controller 2609. As described above, the controller 2609 may control each of the component blocks of the receiver 2608 for reception of a data channel or a control channel transmitted by the base station and each of the component blocks of the transmitter 2604 for transmission of an uplink signal.

In the transmitter 2604 of the UE, the uplink transmission processing block 2601 may generate a signal to be transmitted by performing a process such as channel coding and modulation. The signal generated by the uplink transmission processing block 2601 may be multiplexed with any other uplink signal by the multiplexer 2602, subjected to signal-processing by the transmission RF block 2603, and then transmitted to a base station.

The receiver 2608 of the UE demultiplexes a signal received from the base station and distributes the same to the respective downlink reception processing blocks. The downlink reception processing block 2605 may acquire control information or data transmitted by the base station by performing a process such as demodulation and channel decoding of a downlink signal of the base station. The receiver 2608 may apply an output result of the downlink reception processing block to the controller 2609 to support the operation of the controller 2609.

Figure 27:
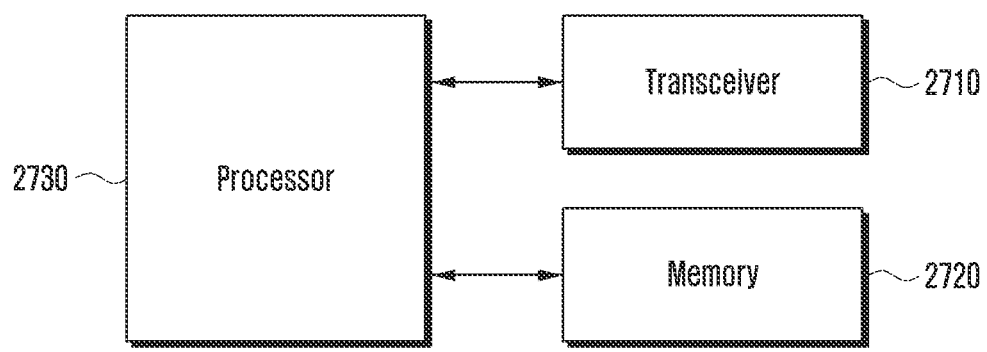
FIG. 27 is a block diagram illustrating the configuration of a UE according to an embodiment of the disclosure.

FIG. 27 is a block diagram illustrating the configuration of a UE according to an embodiment of the disclosure.

Referring to FIG. 27, the UE of the disclosure may include a processor 2730, a transceiver 2710, and a memory 2720. However, the elements of the UE are not limited to the above-described examples. For example, the UE may include more or fewer elements than the aforementioned elements. In addition, the processor 2730, the transceiver 2710, and the memory 2720 may be implemented in the form of one chip. According to an embodiment, the transceiver 2710 of FIG. 27 may include the transmitter 2604 and the receiver 2608 of FIG. 26. In addition, the processor 2730 of FIG. 27 may include the controller 2609 of FIG. 26.

According to an embodiment, the processor 2730 may control a series of processes so that the UE may operate according to the above-described embodiment of the disclosure. For example, the processor may control the elements of the UE so as to perform a transmission and reception method by the UE in a wireless communication system to which CA is applied according to an embodiment of the disclosure. There may be one or a plurality of processors 2730, and the processor 2730 may execute a program stored in the memory 2720 to perform a transmission/reception operation of the UE in a wireless communication system to which the CA is applied according to the disclosure described above.

The transceiver 2710 may transmit or receive a signal to or from the base station. The signal transmitted or received to or from the base station may include control information and data. The transceiver 2710 may include an RF transmitter for up-converting and amplifying a frequency of a transmitted signal, and an RF receiver for low-noise amplifying a received signal and down-converting a frequency thereof. However, this is only an embodiment of the transceiver 2710, and the elements of the transceiver 2710 are not limited to the RF transmitter and the RF receiver. In addition, the transceiver 2710 may receive a signal through a radio channel and output the received signal to the processor 2730, and may transmit a signal, which is output from the processor 2730, through the radio channel.

According to an embodiment, the memory 2720 may store programs and data necessary for the operation of the UE. In addition, the memory 2720 may store control information or data included in a signal transmitted or received by the UE. The memory 2720 may be configured as a storage medium, such as read only memory (ROM), random access memory (RAM), hard disk, compact disc-ROM (CD-ROM), and digital versatile disc (DVD) or a combination of storage media. In addition, there may be one or a plurality of memories 2720. According to an embodiment, the memory 2720 may store a program for performing a transmission/reception operation of the UE in a wireless communication system for applying CA, which is the above-described embodiment of the disclosure.

Figure 28:
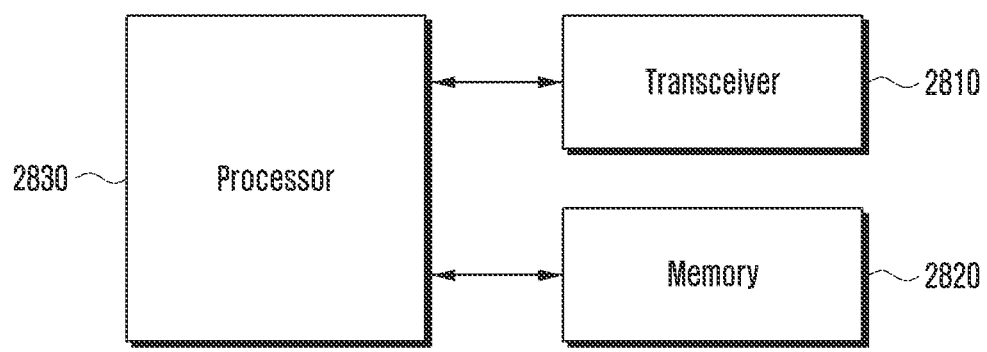
FIG. 28 is a block diagram illustrating the configuration of a base station according to an embodiment of the disclosure.

FIG. 28 is a block diagram illustrating the configuration of a base station according to an embodiment of the disclosure.

Referring to FIG. 28, the base station of the disclosure may include a processor 2830, a transceiver 2810, and a memory 2820. However, the elements of the base station are not limited to the above-described examples. For example, the base station may include more or fewer elements than the aforementioned elements. In addition, the processor 2830, the transceiver 2810, and the memory 2820 may be implemented in the form of one chip.

The processor 2830 may control a series of processes so that the base station may operate according to the above-described embodiment of the disclosure. For example, the processor may control the elements of the base station so as to perform a method for scheduling a UE in a wireless communication system to which CA is applied according to an embodiment of the disclosure. There may be one or a plurality of processors 2830, and the processor 2830 may execute a program stored in the memory 2820 to perform a method for scheduling a UE in a wireless communication system to which CA is applied according to the disclosure described above.

The transceiver 2810 may transmit or receive a signal to or from the UE. The signal transmitted or received to or from the UE may include control information and data. The transceiver 2810 may include an RF transmitter for up-converting and amplifying a frequency of a transmitted signal, and an RF receiver for low-noise amplifying a received signal and down-converting a frequency thereof. However, this is only an embodiment of the transceiver 2810, and the elements of the transceiver 2810 are not limited to the RF transmitter and the RF receiver. In addition, the transceiver 2810 may receive a signal through a radio channel and output the received signal to the processor 2830, and may transmit a signal, which is output from the processor 2830, through the radio channel.

According to an embodiment, the memory 2820 may store programs and data necessary for the operation of the base station. In addition, the memory 2820 may store control information or data included in a signal transmitted or received by the base station. The memory 2820 may be configured as a storage medium, such as ROM, RAM, hard disk, CD-ROM, and DVD or a combination of storage media. In addition, there may be one or a plurality of memories 2820. According to an embodiment, the memory 2820 may store a program for performing a method for scheduling a UE in a wireless communication system for supporting CA, which is the above-described embodiment of the disclosure.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the disclosure, the term "computer program product" or "computer readable medium" is used to generally refer to a medium such as a memory, a hard disk installed in a hard disk drive, or a signal. The "computer program product" or "computer readable medium" is a means that is provided to a transmission/reception method for a terminal in a wireless communication system employing CA according to the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

On the other hand, the embodiments of the disclosure provided in the specification and drawings are merely used in a general sense to easily explain the technical content of the disclosure and to aid understanding of the disclosure, and are not intended to limit the scope of the disclosure. For example, although disclosure is based on a scenario of combining different systems of LTE and 5G, it may be generalized and applied to CA operation in the same system (e.g., 5G). Alternatively, the disclosure may be applied to a scenario of combining 5G and 6G systems to be introduced in the future. It will be apparent to those skilled in the art to which the disclosure pertains that other modifications based on the technical spirit of the disclosure can be implemented in addition to the embodiments disclosed herein. In addition, each of the above embodiments can be operated in combination with each other as needed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal configured with a carrier aggregation (CA) for a first cell and a second cell, the method comprising:
   determining a beam failure of the first cell;
   in response to the determining of the beam failure of the first cell, transmitting a first message of a random access for a beam failure recovery;
   receiving a second message of the random access on a physical downlink shared channel (PDSCH) of the first cell based on the transmission of the first message;
   transmitting a third message of the random access based on the second message; and
   receiving a fourth message of the random access on the PDSCH of the first cell based on the transmission of the third message,
   wherein control information for scheduling the second message and the fourth message is received on a physical downlink control channel (PDCCH) of the second cell.

2. The method of claim 1, wherein one uplink bandwidth part (BWP) of the first cell for the beam failure recovery is associated with a downlink BWP of the first cell and a downlink BWP of the second cell.

3. The method of claim 1, wherein the terminal is configured with a cross carrier scheduling for scheduling first cell through the second cell before the beam failure occurs.

4. The method of claim 1, wherein the first message and the third message are transmitted on an uplink of the first cell in which the beam failure has occurred.

5. The method of claim 1,
   wherein the first message and the third message are transmitted through an uplink of the second cell different from the first cell in which the beam failure has occurred, and
   wherein the first cell is a primary cell (PCell), and the second cell is a secondary cell (SCell) for supporting new radio (NR).

6. A method performed by a base station serving a terminal configured with a carrier aggregation (CA) for a first cell and a second cell, the method comprising:
   receiving a first message of a random access for a beam failure recovery from the terminal in which a beam failure for the first cell has occurred;
   transmitting, to the terminal, a second message of the random access on a physical downlink shared channel (PDSCH) of the first cell based on the first message;
   receiving, from the terminal, a third message of the random access based on the second message; and
   transmitting, to the terminal, a fourth message of the random access on the PDSCH of the first cell based on the receiving of the third message,
   wherein control information for scheduling the second message and the fourth message is transmitted on a physical downlink control channel (PDCCH) of the second cell.

7. The method of claim 6, wherein one uplink bandwidth part (BWP) of the first cell for the beam failure recovery is associated with a downlink BWP of the first cell and a downlink BWP of the second cell.

8. The method of claim 6, wherein the terminal is configured with a cross carrier scheduling for scheduling the first cell through the second cell before the beam failure occurs.

9. The method of claim 6, wherein the first message and the third message are received on an uplink of the first cell in which the beam failure has occurred.

10. The method of claim 6,
wherein the first message and the third message are received through an uplink of the second cell different from the first cell in which the beam failure has occurred, and
wherein the first cell is a primary cell (PCell), and the second cell is a secondary cell (SCell) for supporting new radio (NR).

11. A terminal configured with a carrier aggregation (CA) for a first cell and a second cell, the terminal comprising:
a transceiver; and
a controller configured to:
determine a beam failure of the first cell,
in response to the determination of the beam failure of the first cell, transmit a first message of a random access for a beam failure recovery,
receive a second message of the random access on a physical downlink shared channel (PDSCH) of the first cell based on the transmission of the first message,
transmit a third message of the random access based on the second message, and
receive a fourth message of the random access on the PDSCH of the first cell based on the transmission of the third message,
wherein control information for scheduling the second message and the fourth message is received on a physical downlink control channel (PDCCH) of the second cell.

12. The terminal of claim 11, wherein one uplink bandwidth part (BWP) of the first cell for the beam failure recovery is associated with a downlink BWP of the first cell and a downlink BWP of the second cell.

13. The terminal of claim 11, wherein the terminal is configured with a cross carrier scheduling for scheduling the first cell through the second cell before the beam failure occurs.

14. The terminal of claim 11, wherein the first message and the third message are transmitted on an uplink of the first cell in which the beam failure has occurred.

15. The terminal of claim 11,
wherein the first message and the third message are transmitted through an uplink of the second cell different from the first cell in which the beam failure has occurred, and
wherein the first cell is a primary cell (PCell), and the second cell is a secondary cell (SCell) for supporting new radio (NR).

16. A base station serving a terminal configured with a carrier aggregation (CA) for a first cell and a second cell, the base station comprising:
a transceiver; and
a controller configured to:
receive a first message of a random access for a beam failure recovery from the terminal in which a beam failure for the first cell has occurred,
transmit, to the terminal, a second message of the random access on a physical downlink shared channel (PDSCH) of the first cell based on the first message,
receive, from the terminal, a third message of the random access based on the second message, and
transmit, to the terminal, a fourth message of the random access on the PDSCH of the first cell based on the reception of the third message,
wherein control information for scheduling the second message and the fourth message is transmitted on a physical downlink control channel (PDCCH) of the second cell.

17. The base station of claim 16, wherein one uplink bandwidth part (BWP) of the first cell for the beam failure recovery is associated with a downlink BWP of the first cell and a downlink BWP of the second cell.

18. The base station of claim 16, wherein the terminal is configured with a cross carrier scheduling for scheduling the first cell through the second cell before the beam failure occurs.

19. The base station of claim 16, wherein the first message and the third message are received on an uplink of the first cell in which the beam failure has occurred.

20. The base station of claim 16,
wherein the first message and the third message are received through an uplink of the second cell different from the first cell in which the beam failure has occurred, and
wherein the first cell is a primary cell (PCell), and the second cell is a secondary cell (SCell) for supporting new radio (NR).

* * * * *